(12) United States Patent
Mannan et al.

(10) Patent No.: US 10,516,533 B2
(45) Date of Patent: Dec. 24, 2019

(54) PASSWORD TRIGGERED TRUSTED ENCRYPTION KEY DELETION

(71) Applicant: Mohammad Mannan, Montreal (CA)

(72) Inventors: Mohammad Mannan, Montreal (CA); Lianying Zhao, Montreal (CA)

(*) Notice: Subject to any disclaimer, the term of this patent is extended or adjusted under 35 U.S.C. 154(b) by 295 days.

(21) Appl. No.: 15/424,848

(22) Filed: Feb. 5, 2017

(65) Prior Publication Data

US 2017/0230179 A1    Aug. 10, 2017

Related U.S. Application Data

(60) Provisional application No. 62/291,753, filed on Feb. 5, 2016.

(51) Int. Cl.
*H04L 9/08* (2006.01)
*G06F 21/60* (2013.01)
*G06F 9/4401* (2018.01)

(52) U.S. Cl.
CPC .......... *H04L 9/0897* (2013.01); *G06F 9/4418* (2013.01); *G06F 21/602* (2013.01)

(58) Field of Classification Search
None
See application file for complete search history.

(56) References Cited

U.S. PATENT DOCUMENTS 8,510,352 B2    8/2013  Mehra et al.
8,522,011 B2 *  8/2013  Spalka ................ H04L 9/3073
                                                   380/277

(Continued)

OTHER PUBLICATIONS

Gracewipe: Secure and Verifiable Deletion under Coercion. L. Zhao and M. Mannan. Network and Distributed System Security Symposium (NDSS 2015), Feb. 8-11, 2015, San Diego, CA, USA.

(Continued)

*Primary Examiner* — Kaveh Abrishamkar

(57) ABSTRACT

A method of evaluating secrets in a computer system's trusted execution environment, wherein after evaluation of secrets, a securely stored encryption key is either retrieved or deleted upon entering corresponding secret (password, graphical password, biometric information, data sequence, security token, etc.) or secrets. Deletion of the encryption key can happen in a verifiable manner or in a non-verifiable manner. If a storage is encrypted with the encryption key, deletion of the encryption key makes the encrypted storage irreversibly undecryptable, while retrieval of the key permits decryption of the storage. Two encryption keys can be used to encrypt two separate storages, and then securely stored and processed in the trusted execution environment. Each of the two encryption keys can be retrieved using one or more associated secrets (passwords, etc.), and one or more other secrets would delete the encryption key associated with a preselected storage. During sleep-wake event a computer system's memory can be encrypted with a symmetric key, and the symmetric key can be secured by encrypting with a public encryption key. Corresponding private key is retrieved to decrypt the symmetric key upon evaluation of associated password (secret) in trusted execution environment, while the private key is deleted upon evaluation of one or many preselected deletion password (secret) leaving the encrypted memory undecryptable.

32 Claims, 3 Drawing Sheets

(56) References Cited

U.S. PATENT DOCUMENTS

| | | | |
|---|---|---|---|
| 8,812,875 B1* | 8/2014 | Melvin | G06F 21/78 380/277 |
| 2003/0095659 A1* | 5/2003 | Ishihara | H04L 9/001 380/46 |
| 2003/0101253 A1* | 5/2003 | Saito | H04L 45/02 709/223 |
| 2004/0207509 A1* | 10/2004 | Mlynarczyk | G07C 9/00309 340/5.23 |
| 2012/0155637 A1* | 6/2012 | Lambert | H04L 9/0863 380/44 |
| 2013/0013928 A1* | 1/2013 | Thom | G06F 21/31 713/182 |
| 2013/0024695 A1* | 1/2013 | Kandrasheu | H04L 9/006 713/175 |
| 2013/0262795 A1* | 10/2013 | Aono | G06F 21/78 711/155 |
| 2015/0319294 A1 | 11/2015 | Sudhir | |
| 2017/0026353 A1* | 1/2017 | Chen | H04L 63/061 |
| 2017/0372087 A1* | 12/2017 | Lee | H04L 9/088 |
| 2018/0034791 A1* | 2/2018 | Erez | G06F 21/53 |

OTHER PUBLICATIONS

Deceptive Deletion Triggers under Coercion. L. Zhao and M. Mannan. IEEE Transactions on Information Forensics and Security (TIFS), 11(12): 2763-2776 (Dec. 2016).

Hypnoguard: Protecting Secrets across Sleep-wake Cycles. L. Zhao and M. Mannan. ACM Conference on Computer and Communications Security (CCS 2016), Oct. 24-28, 2016, Vienna, Austria.

* cited by examiner

PASSWORD TRIGGERED TRUSTED ENCRYPTION KEY DELETION

CROSS-REFERENCE TO RELATED APPLICATIONS

This application claims priority to the Provisional Application No. 62/291,753 titled PASSWORD TRIGGERED TRUSTED ENCRYPTION KEY DELETION field on Feb. 5, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Gracewipe: Secure and Verifiable Deletion under Coercion. L. Zhao and M. Mannan. Network and Distributed System Security Symposium (NDSS 2015), Feb. 8-11, 2015, San Diego, Calif., USA.

Deceptive Deletion Triggers under Coercion. L. Zhao and M. Mannan. IEEE Transactions on Information Forensics and Security (TIFS), 11(12): 2763-2776, December 2016.

Hypnoguard: Protecting Secrets across Sleep-wake Cycles. L. Zhao and M. Mannan. ACM Conference on Computer and Communications Security (CCS 2016), Oct. 24-28, 2016, Vienna, Austria.

FIELD OF THE INVENTION

This invention relates to electronic security and more particularly to methods and systems for electronic data security via secrets (for example, passwords, passphrases, graphical passwords) triggered trusted deletion under user coercion, dispossessed devices, and/or during device sleep and wake modes for computer systems.

BACKGROUND OF THE INVENTION

Guessing-resistant, fast, and cryptographically verifiable deletion is desirable in multiple computing platforms and scenarios: laptops and mobile devices are often lost, and subjected to coercion (e.g., at border controls) and physical attacks (e.g., extraction of memory-resident secrets); server platforms must comply with privacy laws, e.g., to effectively erase user data, and reuse storage space; and employee PCs and mobile devices in an enterprise must be wiped in a timely fashion (corporate data), specifically, to handle mass layoffs (e.g., protecting data from angry insiders). While governments/businesses have policies to safely remove data from devices, proper deletion is currently not proven at a technical level by any solution.

Computer security, also known as cybersecurity or IT security, is the protection of information systems from theft or damage to the hardware, the software, and to the information (data) on them, as well as from disruption or misdirection of the services they provide. It includes controlling physical access to the hardware, as well as protecting against harm that may come via network access, data and code injection, and due to malpractice by operators, whether intentional, accidental, or due to them being tricked into deviating from secure procedures.

With the increased reliance on computer systems in most aspect of our society the field has been one of growing importance for nearly 30 years since the first "computer worm." Today computer security is critical in almost any industry exploiting computer systems including, but not limited to, financial systems, utilities, industrial equipment, aviation, consumer devices, corporations, Government, healthcare, and automotive. With the wide variety of so-called "smart" devices including smartphones, televisions, wearable devices, and tiny devices as part of the Internet of Things security attacks can now be launched from essentially anywhere at multiple devices simultaneously using one or more networks including, for example, the Internet, private data networks, wireless networks, and near-field communications.

Increasingly, consumers and individuals within enterprises/Government/corporations have significant electronic data footprints on multiple devices with varying levels of protection and sensitivity. For example, today a user may have all their financial access credentials on their smartphone. Over time attackers have evolved multiple attack techniques including, but not limited to, backdoors, denial-of-service, direct-access, eavesdropping, spoofing, tampering, privilege escalation, phishing, clickjacking, social engineering and trojans. In some instances, the attackers triggered new defences or in others new defences triggered new attack methodologies such that over time security techniques such as firewalls, intrusion detection systems, account access controls, cryptography, multi-factor authentication, trusted platforms, biometric validation, etc. have evolved.

However, despite the significant resources expended over the past 30 years to design, implement, and improve these computer security techniques there are still security issues that have been difficult to overcome or prevent. The first issue is coercion where a user's access control credentials are obtained by an attacker through violence and/or threats of violence to the user or an individual associated with the user such as a partner, child, family member, co-worker etc. or any other coercive means by any person or entity. Whist exploited within television and cinema for major crimes this can be as prosaic as a child threatening another to access and exploit their social media through to threatening a parent to empty his financial accounts right the way to threatening or blackmailing Government officials, corporate employees, etc. There is no existing system for a user to know that the credential details they provide as a result of the coercion results not in the coercer gaining access but securely erasing access to the information completely. There is also no existing system to convince or provide proof of data deletion to an adversary, in the hope that the adversary may realize that there is no further point in coercing the user (e.g., by holding her in detention or by torturing in any means).

The second issue is the vulnerability of computer systems during their "wake up" from a "sleep" mode. Sleep modes are commonly used on computer systems to shut down aspects of the computer system after a period of inactivity to save power, reduce wear and tear, etc. However, generally a user will either not apply a security credential/access control to the recovery process, i.e. the waking up, from this sleep mode or employ one which is relatively low complexity/simple as it may be a frequent occurrence during their work etc. or their laptop, tablet, cell phone, or other computer system in sleep mode in their backpack as they go to work, school, coffee-shop etc. However, generally the system is fully logged in with the user's security credentials so that access to their data etc. simply requires physical access, through theft, coercion etc. or allows the attacker to exploit attacks essentially from "within" system rather than trying to breach firewalls, sidestep intrusion detection systems etc. Even if a computer is equipped with full-disk encryption and other data and network security mechanisms (e.g., password protection, anti-malware, IDS), a lot of unprotected secrets, including passwords and encryption keys, may reside in the computer's main memory (RAM) during sleep. There is no existing system to provide users with an enhanced security process/protocol for their system(s) during sleep mode and the subsequent wake up.

Another issue is, sometimes there is a need to delete encryption keys from multiple computer systems at once. For example, in situations when an organization is laying off a number of employees who hold many computer system from the institution with sensitive information, or a spy network in a hostile country has been exposed threatening the hostile country to capture all the computer systems used by the spy network, or any other situations where multiple computer systems have some encrypted information that must be deleted. There is no system to provide encryption key deletion in multiple computer system over network.

User devices (powered off or in sleep) may fall into the wrong hands in multiple ways, e.g., through coercion, theft, or loss. An adversary may launch password guessing and physical attacks (including main memory extraction) against such a device. It may of utmost importance to a user to be able to delete sensitive data from the dispossessed device. Currently, there is no system to achieve such deletion without using a third-party service that requires network access to the target device (i.e., the attacker must connect the device to the Internet); such third-party remote erase services also lack technical verification of the deletion process.

SUMMARY OF THE INVENTION

It is an objective of the present invention to mitigate limitations within the prior art relating to electronic security and more particularly to methods and systems for electronic data security via password triggered trusted deletion under user coercion, dispossessed devices, and/or during device sleep and wake modes for portable electronic devices, fixed electronic devices, and wearable devices.

In accordance with an embodiment of the invention there is provided a method of securing data upon a computer system by creating two encrypted data storage systems within the computer system and associating at least three passwords with the computer system wherein each of a pair of the at least three passwords allow retrieval and use of encryption keys associated with one of the two encrypted data storage systems and the third password securely deletes the encryption key associated with a preselected encrypted data storage of the two encrypted data storage systems.

In accordance with an embodiment of the invention there is provided a method of securing data upon a computer system comprising:
providing a hidden system upon the computer system for storing data to be secured;
providing a decoy system upon the computer system for storing other data;
encrypting the data being stored upon the hidden system with a first encryption key, KH;
encrypting the other data being stored upon the decoy system with a second encryption key, KN;
associating a first password, PH, for retrieving KH in order to either retrieve secured data or store additional data within the hidden system;
associating a second password, PN, for retrieving KN in order to either retrieve other data or store additional data within the decoy system; and
associating a third password, PD, with performing a secure deletion of KH; wherein
entry of PD results in secure deletion of KH.

In accordance with an embodiment of the invention there is provided a computer subsystem comprising of:
a hidden system forming part of a computer system storing encrypted data with a first encryption key, KH; and
a decoy system forming part of the computer system storing encrypted other data with a second encryption key, KN;
with a first password, PH, for retrieving KH in order to either retrieve secured data or store additional data within the hidden system;
a second password, PN, for retrieving KN in order to either retrieve other data or store additional data within the decoy system; and
a third password, PD, with performing a secure deletion of KH; whereas receiving PD results in secure deletion of KH.

In accordance with an embodiment of the invention there is provided a non-transitory non-volatile computer readable medium storing executable instructions thereon that, when executed by a microprocessor, perform a method comprising the steps:
encrypting data being stored upon a hidden system forming part of a computer system with a first encryption key, KH;
encrypting other data being stored upon a decoy system forming part of the computer system with a second encryption key, KN;
associating a first password, PH, for retrieving KH in order to either retrieve secured data or store additional data within the hidden system;
associating a second password, PN, for retrieving KN in order to either retrieve other data or store additional data within the decoy system;
associating a third password, PD, with performing a secure deletion of KH; and
receiving PD results in secure deletion of KH.

In accordance with an embodiment of the invention there is provided a method of securing data upon a computer system during a sleep-wake event by encrypting active system memory with a symmetric key (SK) as computer system enters a sleep mode of the sleep-wake event and encrypting the SK with a public encryption key (HGPUB) such that the encrypted active system memory can only be decrypted with entry of the correct password to retrieve a private key corresponding to HGPUB (HGPRIV) that allows decryption of SK and therein the encrypted active system memory and entry of a preselected deletion password (PD) will delete HGPRIV.

In accordance with an embodiment of the invention there is provided a method of securing data upon a computer system during a sleep-wake event:
associating a symmetric encryption key (SK) with the encryption of active system memory of the computer system upon the initiation of a sleep mode of the computer system;
encrypting the active system memory of the computer system with SK during entry into the sleep mode of the computer system;
receiving a public key, HGPUB, for encrypting SK during entry into the sleep mode of the computer system;
storing the encrypted SK within the memory of the computer system;
receiving a correct password (PW) during initiation of a wake mode of the computer system after the sleep mode has been entered;
retrieving a private key HGPRIV corresponding to HGPUB from secure storage of the computer system upon receipt of PW;
decrypting SK when HGPRIV is retrieved allowing subsequent decryption of the encrypted active system memory encrypted with SK during entry into the sleep mode; wherein
receipt of a special deletion password (PD) instead of PW, during initiation of the wake mode of the computer system after the sleep mode has been entered results in deletion of HGPRIV or receipt of multiple incorrect passwords during initiation of the wake mode of the computer system after the sleep mode has been entered results in deletion of HGPRIV.

In accordance with an embodiment of the invention there is provided a non-transitory non-volatile computer readable medium storing executable instructions thereon that, when executed by a microprocessor, perform a method comprising the steps:
associating a symmetric encryption key (SK) with the encryption of active system memory of the computer system upon the initiation of a sleep mode of the computer system;
encrypting the active system memory of the computer system with SK during entry into the sleep mode of the computer system;
receiving a public key, HGPUB, for encrypting SK during entry into the sleep mode of the computer system;
storing the encrypted SK within the memory of the computer system;
receiving a correct password (PW) during initiation of a wake mode of the computer system after the sleep mode has been entered;
retrieving a private key HGPRIV corresponding to HGPUB from secure storage of the computer system upon receipt of PW;
decrypting SK when HGPRIV is retrieved allowing subsequent decryption of the encrypted active system memory encrypted with SK during entry into the sleep mode; wherein
receipt of a special deletion password (PD) instead of PW, during initiation of the wake mode of the computer system after the sleep mode has been entered results in deletion of HGPRIV or receipt of multiple incorrect passwords during initiation of the wake mode of the computer system after the sleep mode has been entered results in deletion of HGPRIV.

Two systems—named "Gracewipe" and "Hypnoguard"—have been described in great detail that put forward many different embodiments of the invention, and many different variations thereof that will be apparent to a person ordinarily skilled in the art of general computer science and computer security. However, these embodiments are described only as examples of how the invention can be implemented using current existing technology. Other similar variations of obvious implementations of the invention are also possible and can be implemented without undue experimentation. In addition, as technology progresses and other variations of technologies used to implement these examples become available those similar technologies can be used instead of currently available technology as would be obvious to those ordinarily skilled in the art of general computer science and computer security. For example, as technology has progressed "computer system" has included mainframes, minicomputer, personal computer, laptop, smartphone, smartwatch, smart devices, smart appliances, wearable devices, etc. and many obvious similar ones will be included in future. Similarly, as technology has progressed, "storage" has included mechanical storage, magnetic storage, electronic memory, optical device, SSD, cloud storage, etc. and many obvious similar ones will be included in future. Therefore, the terms defined or used in this description should be interpreted accordingly to include similar replacements in current and future technology.

Using existing computing technologies, we design the Gracewipe and Hypnoguard systems that provide the following features together: triggering the hidden key deletion process in a way that is indistinguishable from unlocking the protected disk/RAM data; local and network-based deletion trigger; fast, full memory encryption before entering sleep mode; verification of the key deletion process; restricting guessing of passwords used for data confidentiality; and an extended family of unlocking schemes for triggering deletion of disk and RAM data, to achieve better plausibility, security and usability.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
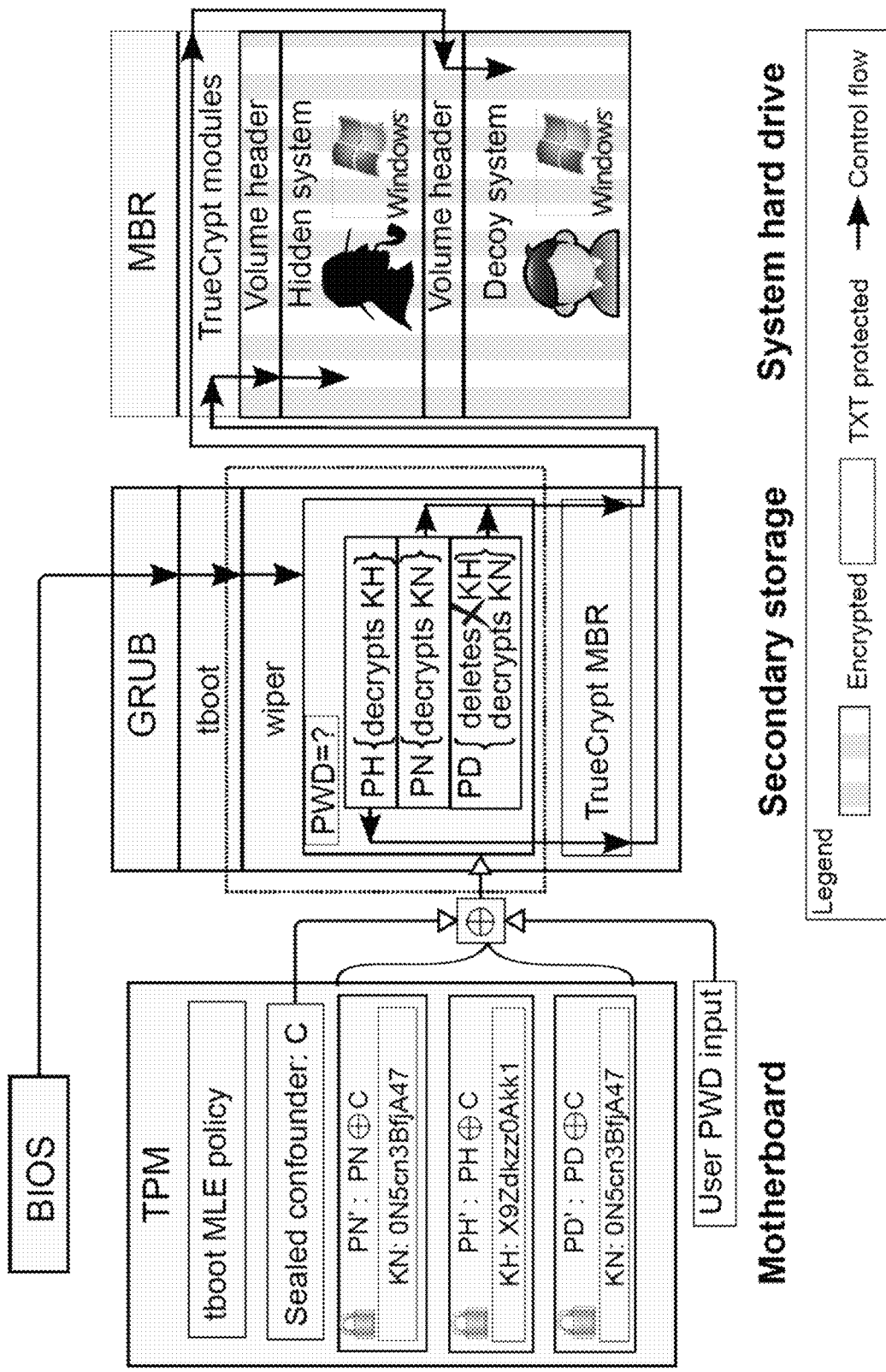
FIG. 1 depicts schematically the location of elements within a Gracewipe system together with control flow according to an embodiment of the invention.

The present invention is directed to electronic security and more particularly to methods and systems for electronic data security via password triggered trusted deletion under user coercion and/or during device sleep and wake modes for portable electronic devices, fixed electronic devices, and wearable devices.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

"Secret" and "password" as used herein and throughout this disclosure, refer to secret information in textual, graphical, electronic, or in any other format upon providing of which access is given to a predefined and secured data, storage, or system. Secrets prove identity of accessor or accessing system to a computer system. The term "password" means the exact same thing as "secret" throughout this disclosure. Examples of secret or password include, but are not limited to, password, passphrase, graphical password, cognitive password, biometric information, data sequence, security token, time synchronized one-time password, etc., or a combination of secrets (e.g., as used in multi-factor authentication schemes).

The terms "secret" and "password" are used interchangeably throughout this disclosure. The term "password" can be replaced with the term "secret" in each reference throughout this disclosure without changing any implementation details, or workings of any of the embodiment. Interchangeability of the terms "secret" and "password" is obvious to a person skilled in the art of general computer security, who can implement any of the embodiments described or claimed in this disclosure replacing "password" with "secret" without any additional undue experimentation.

"Data" or "information" as used herein and throughout this disclosure, refers to any content in a computer system being stored or transmitted in the form of electrical, optical, or other signals and stored or kept on electrical, magnetic, optical, mechanical, or other type of storage, including executable instructions, user data, system data, or any information, numbers, characters, or symbols which is used by a computer system or on which operations are performed by a computer system.

Reference to terms such as "storage", "data storage", and "data storage system" means any electronic storage or data storage medium or system that store any computer system readable signal or information, including electromagnetic storage, optical storage, electronic storage, and any other similar technology available currently or in future that is obvious to a person skilled in the art of general computer science to be considered as storage, data storage or electronic storage. Examples include, but are not limited to, disk drives, flash drives, memory, solid state storage, magnetic tape, punched cards, cloud storage, etc.

Reference to terms such as "memory", "memory of computer system", "RAM", and "memory storage" means any type of long term, short term, volatile, nonvolatile, or other storage medium and is not to be limited to any particular type of memory or number of memories, or type of media upon which memory is stored.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tool (with which computer programs are created). Generally, within the following description with respect to embodiments of the invention an application is generally presented in respect of software permanently and/or temporarily installed upon a PED and/or FED.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterized by an ability to exploit one or more embodiments of the invention. A user may be associated with biometric data which may be, but not limited to, monitored, acquired, stored, transmitted, processed and analyzed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information, or other security-sensitive personal/business information. It may also include a user's biometric information, an estimation of the user's biometric information, or a projection/prediction of a user's biometric information derived from current and/or historical biometric information.

A "wearable device" relates to miniature electronic devices that are worn by the user including those under, within, with or on top of clothing and are part of a broader general class of wearable technology which includes "wearable computers" which in contrast are directed to general or special purpose information technologies and media development. Such wearable devices may include, but not be limited to, smartphones, smart watches, e-textiles, smart shirts, activity trackers, wearable sensors, smart glasses, environmental sensors, medical sensors, biological sensors, physiological sensors, chemical sensors, ambient environment sensors, position sensors, neurological sensors, drug delivery systems, medical testing and diagnosis devices, and motion sensors. The wearable devices and/or wearable sensors may include, but not be limited to, devices that can stimulate and/or measure parameters that are designed to fit on or near the perineum, anal area, vagina, clitoral area, and nipples.

"Biometric" information as used herein may refer to, but is not limited to, data relating to a user characterized by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odor, and scent. Biometric information may also include data relating to behavioral characteristics, including but not limited to, typing rhythm, gait, and voice.

Within embodiments of the invention individuals and/or users are identified as "he", "she", "him", "her" etc. However, it would be evident that where a masculine identifier of an individual and/or user is employed that alternatively they may be female and the converse may also be applied. Further the use of a singular or plural identifier in respect of individuals and/or users is employed then it would be evident that the converse may also be applied.

Hypnoguard™ and Gracewipe™ are trademarks owned by the inventors in association with software products implementing embodiments of the invention. Gracewipe™ is a system for a user to know that the credential details they provide as a result of the coercion results not in the coercer gaining access but securely erasing access to the information completely. Hypnoguard™ is a system to provide users with an enhanced security process/protocol for their system(s) during sleep mode and the subsequent wake up. Hypnoguard™ and Gracewipe™ both implement some common features of the invention described here, and they are only two of the many possible implementations that are possible for the invention described. In addition, Gracewipe™ enables boot-time protection for encrypted disk data. Furthermore, Hypnoguard™ enables wakeup-time protection for memory-resident secrets, including disk encryption keys. For verifiable data deletion when subject to advanced attacks (including coercion, memory attacks, password guessing) in both powered-off and sleep states, Gracewipe™ and Hypnoguard™ must be used together; for example, without Hypnoguard™, an attacker may be able to extract disk encryption keys from main memory to decrypt Gracewipe™ protected disk data. Hypnoguard™ additionally solves the problem of securing all memory-resident data stored in memory (security-sensitive or otherwise) during a sleep-wake cycle.

A: Secure and Verifiable Deletion System—Gracewipe

A.1. Introduction and Motivation

Plausibly deniable encryption (PDE) schemes for file storage were proposed more than a decade ago for the first academic proposal. In terms of real world PDE usage, TrueCrypt is today possibly the most widely used tool, and has been available since 2004 although in 2014 the project was no longer maintained although no significant flaws have been identified. TrueCrypt provides a source-available freeware utility for on-the-fly encryption (OTFE). Several other systems also have been proposed and implemented including VeraCrypt and CipherShed freeware projects. However, these solutions share an inherent limitation in that an attacker can detect the existence of such systems. Whilst a user may provide reasonable explanation for the existence of such tools or random-looking free space; e.g., claiming that TrueCrypt is used only as a full-disk encryption (FDE) tool, no hidden volumes exist; or, the random data is the after-effect of using tools that write random data to securely erase a file/disk their presence is evident. Accordingly, a coercive attacker may exploit a variety of physical and/or psychological approaches, e.g. detain and punish a user, to reveal the true password for the hidden volume. Such coercion is commonly referred to as "rubberhose cryptanalysis", which is alleged to be used in some countries. The use of multiple hidden volumes or security levels, such as StegFS a steganographic file system exploiting ext2 filesystem in Linux, may also be of no use if the coercive attacker is patient. Another avenue for the attacker is to derive candidate keys from a password dictionary, and keep trying those keys, i.e., a classic offline dictionary attack. If the attacker possesses some knowledge about the plaintext, e.g., the hidden volume contains a Windows installation, such guessing attacks may (easily) succeed against most user-chosen passwords.

Another option for the victim is to provably destroy/erase data when being coerced. However, such coercive situations mandate a very quick response time from any such tools used for erasure irrespective of media type, e.g., magnetic or flash. As such tools including AT Attachment (ATA) secure erase on external computer drives and Darik's Boot and Nuke (DBAN) that rely on data overwriting are not acceptable solutions as the attacker can simply terminate the tool being used by turning off power, or make a backup copy of the target data first. This need for rapid destruction was recognized by government agencies decades ago; see Slusarczuk et al. in "Emergency Destruction of Information Storing Media" (Inst. Defense Analyses, Report R-321, 1987). For a quick deletion, cryptographic approaches appear to be an appropriate solution and have been implemented by several storage vendors in solid-state/magnetic disk drives that are commonly termed as self-encrypting drives (SEDs). SEDs allow overwriting of the data encryption key via an application programming interface (API) call. Currently, to the inventor's knowledge, no solutions offer pre-operating system (pre-OS) secure erase that withstand coercive threats (i.e., with undetectable deletion trigger). Even if such a tool is designed, still several issues remain including that verifiable deletion is not possible with SEDs alone as we also need to know how to ensure that the secure erase API has been executed, and the implicit deletion of the key without the adversary being notified is not possible, as required in deletion under coercion, i.e., calls to the deletion API can be monitored via e.g., the SATA/IDE interface.

Accordingly, the inventors have established a solution described below, referred to as Gracewipe™, which is designed to be implemented on top of a PDE/FDE tool such as TrueCrypt™ or SEDs that can make the encrypted data permanently inaccessible without exposing the victim. When coerced to reveal their hidden volume encryption password, the victim will use a special pre-registered password that will irrecoverably erase the hidden volume key. The coercer cannot distinguish the deletion password from a regular password used to unlock the hidden volume key. After deletion, the victim can also prove to the coercer that Gracewipe has been executed, and the key cannot be recovered anymore. A trusted hardware chip such as the Trusted Platform Module (TPM) alone cannot, today, realize Gracewipe, as current TPMs are passive, i.e., they run commands as sent by the CPU, and are unable to execute external custom logic. According to an embodiment of the invention to implement Gracewipe, we use a TPM chip along with Intel's trusted execution technology (TXT), a special secure mode available in several consumer-grade Intel CPU versions (similar to AMD's secure virtual machine (SVM)). Accordingly, within the following description for ease of reference we refer to Gracewipe in respect of an embodiment of the invention.

The basic logic in Gracewipe for a PDE-enabled FDE system (e.g., TrueCrypt) can be summarized as follows. A user selects three passwords during the setup procedure:

(i) Password PH that unlocks only the hidden volume key;

(ii) Password PN that unlocks only the decoy volume key; and (m) Password PD that unlocks the decoy volume key and overwrites the hidden volume key.

Optionally, multiple PDs may also be used within other embodiments of the invention. These passwords and volume keys are stored as TPM-protected secrets that cannot be retrieved without defeating TPM security. Depending on the scenario, the user will provide the appropriate password. The attacker can coerce the victim to reveal all passwords; the user may reveal PN and PDs, but not PH. Attackers' success probability of accessing the hidden volume can be configured to be very low (e.g., deletion after a single invalid password), and will depend on their use of user-supplied or guessed passwords, and/or the deployed variant of Gracewipe. Overwrite of the hidden volume key occurs within the hardware chip, an event the inventors presume to be unobservable to the attacker. Now, the attacker does not enjoy the flexibility of password guessing without risking the data being destroyed. For a regular FDE system, e.g., SEDs, the decoy volume is not needed, and as such, Gracewipe will require only two passwords (PH and PD).

The relatively simple design basis of Gracewipe however faced several challenges when implemented with real-world systems such as TrueCrypt and SEDs. As Gracewipe works in the pre-OS stage, no ready-made TPM interfacing support is available, especially for some complex TPM operations as outlined in Section A.4. Accordingly, it is necessary to construct our own TPM protocol messages as well as combining several tools in a way they were not designed for, e.g., TrueCrypt master boot record (MBR) and Windows volume boot record (VBR; see Section A.3), thereby requiring that we satisfy each component with the environment it expects.

The embodiments of the invention described with respect to Gracewipe are based upon TrueCrypt as it is open sourced. Auditability is an essential issue to security applications, and most FDE solutions are proprietary software/firmware and thus verifying their design and implementation becomes difficult for users. Accordingly, as we wish to load Windows after exiting TXT (as TrueCrypt FDE is only available in Windows), which requires invocation of real-mode BIOS interrupts. For the SED-based solution, we also choose to boot a Windows installation from the SED disk, as Windows is still more commonly used by everyday computer users. However, our Windows based prototypes require disabling direct memory access (DMA), and thus suffers a performance penalty (the system remains usable nonetheless, for non-disk-bound tasks); the root cause appears to be Intel TXT's incompatibility with real-mode (switching from protected to real-mode is required by Windows boot). However, such issues have been addressed in our final implementation. A Linux-based OS boot after Gracewipe provides an easier system to modify/implement, as Linux can be easily modified, but that would have less utility than this current Windows-targeted implementation.

Within the Gracewipe embodiment presented the victim actively participates in destroying the hidden/confidential data. In some jurisdictions this may lead to their punishment alongside the coercer. However, Gracewipe is expected to be used in situations where the exposure of hidden data is in no way a preferable option or an option. We assume a coercive adversary, who is likely to release the victim when there is no chance of recovering the target data. Complexities of designing technical solutions for data hiding including deniable encryption and verifiable destruction in instances of coercion have not been a significant area of research or consideration but some of the issues have been discussed, see for example Rescorla in "Protecting Your Encrypted Data in the Face of Coercion" (http://www.educatedguesswork.org/2012/02/protecting_your_encrypted_data.html). Within the prior art some authentication schemes under duress have been explored and may be integrated with Gracewipe. However, these prior art schemes cannot achieve Gracewipe's goal of being able to delete cryptographic keys associated with a user whilst they are under duress, using "off-the-shelf" computing hardware.

Beneficially embodiments of the invention provide multiple benefits including secure deletion in coercive situations, a system executable in even high volume low cost consumer grade devices, flexibility to other software/hardware, and a pre-OS trusted execution environment. Considering these:

A.1.1 Secure Deletion in Coercive Situations:

Gracewipe provides a secure data deletion mechanism to be used in coercive situations, when protecting the hidden/confidential data is of utmost importance. To the best of the inventor's knowledge, this is the first method to combine multiple features including:

triggering the hidden key deletion process in a way that is indistinguishable from unlocking the hidden data;
verification of the deletion process;
preventing offline guessing of passwords used for data confidentiality;
restricting password guessing only to an unmodified Gracewipe environment; and
tying password guessing with the risk of key deletion.

A.1.2 Consumer Grade Systems:

Embodiments of the invention implemented in Gracewipe exploit a PDE-mode TrueCrypt installation in conjunction with an SED disk. The secure storage relies on TPM chips and the trusted execution mode of modern Intel/AMD CPUs. Accordingly, such capabilities are widely available even in consumer-grade systems. Similar capabilities also exist in existing mobile systems (e.g., ARM TrustZone).

A.1.3. Software/Hardware Flexibility:

The inventor's implementations of Gracewipe whilst exploiting TrueCrypt and SED are sufficiently generic for easy adaptation to other existing software and hardware based FDE/PDE schemes.

A.1.4. Pre-OS Trusted Execution Environment:

Whilst established for secure deletion the pre-OS trusted execution environment established by embodiments of the invention should enable other security-related checks, e.g., verifying OS integrity as in Windows secure boot, but through an auditable, open-source alternative.

A.2. Background, Goals, and Threat Model

A.2.A. Background

Gracewipe leverages several existing tools and mechanisms. In this section a brief overview of these is provided to aid understanding of Gracewipe's design and implementation.

Multiboot.

The multiboot specification is an open standard for multistage/coexistent booting of different operating systems or virtual machine monitors (VMMs) which has been implemented in several tools, e.g., GRUB, kexec tools, and tboot. It enforces deterministic machine state and standardized parameter passing so that each stage (e.g., bootloader) knows what to expect from the previous stage and what to prepare for the next stage.

Chainloading.

As Windows does not support the multiboot specification, it is chainloaded by Gracewipe. Chainloading involves loading an OS/VMM as if it is being loaded at system boot-up (which may be actually from another running OS/VMM). The target image is loaded at a fixed memory address in real-mode (usually at 0x0000:0x7C00). The system jumps to the first instruction of the image without parsing its structure (except for the recognition of a master boot record (MBR)). At that time, machine state is similar to after a system reset, e.g., real-mode, initialized I/O, default global/interrupt descriptor table (GDT/IDT). Within prototype versions by the inventors GRUB was employed as the bootloader for Gracewipe, as GRUB supports both multi-boot and chainloading.

Tboot.

Tboot is an open-source project by Intel that uses the trusted execution technology (TXT) to perform a measured late-launch of an OS kernel (currently only Linux) or VMM (e.g., Xen). It can therefore reload the platform dynamically (with the instruction GETSEC[SENTER]) and chain the measurement (through the TPM extend operation) of the whole software stack for attestation, including ACM (Intel's proprietary module), tboot itself, and any other binaries defined in the launch policy. The measurement outcome is checked against pre-established known values, and if different, the booting process may be aborted. Thereafter, the run-time environment is guaranteed to be isolated by TXT, with external DMA access restricted by VT-d (memory mapped I/O (MMIO)). Tboot can load (multiboot) an extended loader format (ELF) image and Linux bzImage. Within the prototype this must be preceded by GRUB as tboot cannot be chainloaded.

TrueCrypt.

The TrueCrypt on-the-fly full-disk encryption (FDE) utility is possibly the most popular choice in its kind. It supports plausibly deniable encryption (PDE) in the form of a hidden volume, which appears as free space of another volume. In the regular mode, an encrypted volume is explicitly mounted through TrueCrypt, on demand, after the OS is already booted up. We use its PDE-FDE mode (available only in Windows at this point), where the OS volume is also encrypted and the original Windows MBR is replaced with the TrueCrypt MBR, which prompts for a password and loads the next 40-60 sectors (termed TrueCrypt modules) to decrypt the system volume.

Self-Encrypting Drives (SEDs).

SEDs offer hardware-based FDE as opposed to software-only FDE solutions. A major benefit of an SED is its on-device encryption engine, which always keeps disk data encrypted. A media encryption key (MEK) is created at provisioning time and used to encrypt all data on the drive. MEK never leaves an SED (similar to the storage root key (SRK) of a TPM), and is only accessible to the on-device encryption engine (i.e., not exposed to random access memory (RAM)/central processor unit (CPU)). An authentication key (AK) derived from a user-chosen password is used to encrypt the MEK. Several storage manufacturers now offer SED-capable disks. Trusted Computing Group (TCG) also has its open standard named Opal/Opal2 for SEDs. SEDs provide various features such as instant secure erase and multiple user management.

With regard to the user interface for password entry, SEDs are usually shipped with an ATA security compliant interface as in regular drives. When a drive is powered up, it is by default in a locked state, until the user enters the correct password to switch it over to an unlocked state. The drive falls back to locked state at power loss. Unlocking involves using AK to decrypt MEK and, thus enabling decryption of disk data.

A.2.B. Goals and Terminology

In this section, we specify Gracewipe's goals, and explain how they can be achieved. We also define the terminology as used in the remainder of the paper.

Goals.

(1) When under duress, the user should be able to initiate key deletion in a way indistinguishable to the adversary from entering the correct credential(s) (e.g., password). The adversary is aware of Gracewipe, and knows the possibility of key deletion, but is unable to prevent such deletion, if he wants to try retrieving the suspected hidden data. (2) In the case of emergency data deletion (e.g., noticing that the adversary is close-by), the user may also want to erase their data quickly. (3) In both cases, when the deletion finishes, the adversary must be convinced that the hidden data has become inaccessible and no data/key recovery is possible, even with (forced) user cooperation. (4) The adversary must be unable to retrieve TPM-stored volume encryption keys by password guessing, without risking key deletion; i.e., the adversary can attempt password guessing only through the Gracewipe interface. Direct offline attacks on volume keys must also be computationally infeasible.

Terminology and Notation

We primarily target two types of storage encryption systems, namely software-based FDE with support for plausible deniability (termed as PDE-FDE) and hardware-based FDE. However, Gracewipe may be employed with other storage-encryption systems with or without modification according to the system. For a PDE-FDE system (e.g., TrueCrypt under Windows), a decoy system refers to the one appearing to be the protected system. The user should maintain certain frequency of using it for the purpose of deception. A hidden system is the actual protected system, the existence of which may be deniable and can only be accessed when the correct password is provided. The user should avoid leaking any trace of its use (as in TrueCrypt. We let KN be the key needed to decrypt the decoy system, and PN is the password for retrieving KN. Similarly, KH is the key needed to decrypt the hidden system and PH is the password for retrieving KH. In addition, PD is the password to perform the secure deletion of KH; note that there might be multiple PDs (cf. panic password), although within the initial implementation only a single KN and KH are stored/sealed in TPM's non-volatile RAM (NVRAM), which can be retrieved using the corresponding password, only within the verified Gracewipe environment. For a regular FDE system (e.g., SEDs), no decoy systems are needed, and thus no need to set up KN and PN. The inventors use hidden/protected/confidential data interchangeably in this document.

Overview of Achieving Gracewipe Goals.

For goal (1), we introduce PD that retrieves KN but at the same time deletes KH from TPM. Thus, if either the user/adversary enters a PD, the hidden data will become inaccessible and unrecoverable (due to the deletion of KH). PN, PH and PDs should be indistinguishable, e.g., in terms of password composition. In a usual situation, the user can use either PH or PN to boot the corresponding system. If the user is under duress and forced to enter PH, they may input a PD instead, and Gracewipe will immediately delete KH (so that next time PH only outputs a null string). Under duress, the user can reveal PN/PDs, but must refrain from exposing PH. The use of any PD at any time (emergency or otherwise), will delete KH the same way, and thus goal (2) can be achieved.

Goal (3) can be achieved by a chained trust model and deterministic output of Gracewipe. The trusted environment is established by running the deletion operation via DRTM, e.g., using Intel TXT through tboot. We assume that Gracewipe's functionality is publicly known and its measurement (in the form of values in TPM platform configuration registers (PCRs)) is available for the target environment, so that the adversary can match the content in PCRs with the known values, e.g., through a TPM quote operation. Gracewipe prints a hexadecimal representation of the quote value, and also stores it in TPM NVRAM for further verification. A confirmation message is also displayed after the deletion (e.g. "A deletion password has been entered and the hidden system is now permanently inaccessible"). Note that Gracewipe can be configured to suppress the verification message or the creation of cryptographic proofs, if the user chooses to, depending on her situation.

For goal (4), we use TPM's sealing feature, to force the adversary to use a genuine version of Gracewipe for password guessing. Sealing also stops the adversary from modifying Gracewipe in such a way that it does not trigger key deletion, even when a PD is used. We use long random keys (e.g., 128/256-bit Advanced Encryption Standard (AES) keys) for actual data encryption to thwart offline attacks directly on the keys. A result of goal (4) is that, if a Gracewipe-enabled device (e.g., a laptop) with sensitive data is lost or stolen, the attacker is still restricted to password guessing with the risk of key deletion.

A.2. C. Threat Model and Assumptions

Here we specify assumptions for Gracewipe, and list unaddressed issues.

1) We assume the adversary to be hostile and coercive, but rational otherwise. He is diligent enough to verify the TPM quote when key deletion occurs, and then (optimistically) stop punishing the victim for password extraction, as the hidden password is of no use at this point. If the victim suspects severe retaliation from the adversary, she may choose to use the deletion password only if the protected data is extremely valuable, i.e., she is willing to accept the consequences of provable deletion.

2) The adversary knows well (or otherwise can easily find out) that TrueCrypt/SED disk is used, and probably there exists a hidden volume on the system. He is also aware of Gracewipe, and its use of different passwords for accessing decoy/hidden systems and key deletion. However, he cannot distinguish PDs from other passwords on a list that the victim is coerced to provide.

3) The adversary can have physical control of the machine and can clone the hard drive before trying any password. However, we assume that the adversary does not get the physical machine when the user is using the hidden system (i.e., KH is in RAM), Otherwise, he can use cold-boot attacks to retrieve KH and such attacks are excluded in our threat model. The Hypnoguard system, as introduced by the inventors, protects the keys in RAM while the computer is in a power-saving mode (e.g., sleep).

4) The adversary may reset the TPM owner password with the take ownership command, or learn the original owner password from the victim; note that NVRAM indices (where we seal the keys) encrypted with separate passwords are not affected by resetting ownership, or the exposure of the owner password. With the owner password, the adversary can forge TXT launch policies and allow executing a modified Gracewipe instance. Any such attempts will fail to unlock the hidden key (KH), as KH is sealed with the genuine copy of Gracewipe. However, with the modifications, the attacker may try to convince the user to enter valid passwords (PH, PN or PD), which are then exposed to the attacker. We expect the victim not to reveal PH, whenever the machine is suspected to have been tampered with. We do not address the so called evil-maid attacks, but Gracewipe can be extended with existing solutions against such attacks.

5) We exclude inadvertent leakage of secrets/passwords from human memory via side-channel attacks, e.g., the EEG-based subliminal probing to which counter-measures may be applied. We also exclude truth-serum induced attacks; effectiveness of such techniques is also strongly doubted.

6) Gracewipe facilitates secure key deletion, but relies on FDE-based schemes for data confidentiality. For our prototypes, we assume TrueCrypt and SED adequately protect user data and are free of backdoors. The SED-based Gracewipe relies on a proper implementation of crypto-primitives and FDE on SED devices, as Gracewipe only unlocks/erases the ATA security password from TPM NVRAM. For the SED version, the user must choose a real SED disk instead of a regular drive, even though Gracewipe only uses the ATA security protocol supported by most current hard drives. The SED disk must ensure that MEK is encrypted properly with the ATA security password and the user data is properly encrypted with MEK. In contrast to TrueCrypt's open source nature, unknown design/implementation vulnerabilities in a specific SED may invalidate Gracewipe's security guarantees.

7) We assume the size of confidential/hidden data is significant, i.e., not memorizable by the user, e.g., a list of all US citizens with top-secret clearances (reportedly, more than a million citizens). After key deletion, the victim may be forced to reveal the nature of the hidden data, but she cannot disclose much.

8) The trusted execution environment as available in major CPU types (Intel/AMD/ARM) is assumed to be trustworthy and cannot be compromised, and thus ensures the calculated measurements can be trusted (hence only genuine Gracewipe unseals the keys). Known prior attacks on TXT include exploiting the CPU's System Management Mode (SMM) to intercept TXT execution. Protections against such attacks include: Intel SMI transfer monitor (STM), and the newly proposed, Intel software guard extensions (SGX). Additionally, we assume that hardware-based debuggers cannot compromise Intel TXT. So far, we could not locate any documentation from Intel in this regard but note that AMD's SVM disables hardware debug features of a CPU.

A.3. Gracewipe Design

In this section, we expand the basic design as outlined in Section A.1. We primarily discuss Gracewipe for an FDE solution with deniable hidden volume support (i.e., PDE-FDE), and we use TrueCrypt as a concrete example of this. We provide implementation details in Sections A.4 and A.5. The FDE-only version is simpler than the PDE-FDE design, e.g., no decoy volume and no chainloading are needed; for details of the FDE-only version, see Section A.6. These two versions mostly use the same design components, differing mainly in the key unlocked by Gracewipe and the destination system that receives the key.

A.3.A Overview and Disk Layout.

Gracewipe inter-connects several components, including: BIOS, GRUB, tboot, TPM, wiper (provides Gracewipe's core functionality—see below under "Wiper"), TrueCrypt MBR (or SED/ATA interface), and Windows bootloader. An overview of the Gracewipe components, disk layout when TrueCrypt is used, and execution control flow are depicted in FIG. 1. The hidden data is stored encrypted on a hard drive, as in a typical TrueCrypt hidden volume. We assume two physical volumes: one hosting the decoy system (regular TrueCrypt encrypted volume), and the other volume containing the hidden system (hidden TrueCrypt volume). KN and KH are technically TrueCrypt volume passwords for the two volumes respectively, but we generate them from a random source. Both are stored in TPM NVRAM, and are not typed/memorized explicitly by the user. In the deployment phase, they are generated in a secure way with good entropy and configured as TrueCrypt passwords. Each valid password (including any PD) will decrypt a corresponding key in TPM NVRAM for a specific purpose.

A.3.B Wiper.

The core part of Gracewipe's functionality includes bridging its components, unlocking appropriate TPM-stored keys, and deletion of the hidden volume key. We term this part as the wiper, which is implemented as a module securely loaded with tboot. It prompts for user password, and its behavior is determined by the entered password (or more precisely, by the data retrieved from TPM with that password). Namely, if the retrieved data contains only a regular key (KH/KN), the wiper passes it on to TrueCrypt, or if it appears otherwise (as designated by a deletion indicator) to have a control block for deletion, the wiper performs the deletion and passes the decoy key KN to TrueCrypt. We modified TrueCrypt to directly accept input from the wiper (i.e., the original TrueCrypt password prompt is bypassed), and boot one of the encrypted systems.

As the wiper must operate at an early stage of system boot and still provide support for relatively complex functionality, it must meet several design considerations, including:

1) It must be bootable by tboot, as we need tboot for the measured launch of the wiper. This can be achieved by conforming to required file formats (e.g., ELF) and header structures (e.g., multiboot version number).

2) It must load the TrueCrypt loader for usual operations, e.g., decrypt the correct volume and load Windows. This is mainly about parameter passing (e.g., TrueCrypt assumes register DL to contain the drive number).

3) It must access the TPM chip and perform several TPM operations including sealing/unsealing, quote generation, and NVRAM read/write. Note that at this point, there is no OS or trusted computing software stack (such as TrouSerS) to facilitate TPM operations.

4) It must provide an expected machine state for the component that will be loaded after the wiper (e.g., Windows). Both TrueCrypt and Windows assume a clean boot from BIOS; however, Windows supports only strict chainloading, failure of which causes several troubles including system crash (see Section A.5).

A.3.C Execution Steps.

Gracewipe's execution flow is outlined in FIG. 1. It involves the following steps:

(1) The system BIOS loads GRUB, which then loads tboot binary as the kernel, together with other modules including the wiper, ACM SINIT module and the policy list (see Section A.4.C);

(2) Tboot checks for required support on the platform; if succeeded, tboot starts the MLE by calling GETSEC [SENTER];

(3) All measurements are calculated and matched with the values stored in TPM. If the matching is successful, the wiper is loaded in the same context as tboot; otherwise, execution is halted.

(4) The wiper prompts the user for password, and uses the entered password to decrypt locations where we store KH/KN one by one. If none is decrypted, it halts the system; otherwise, the wiper copies the decrypted key (i.e., TrueCrypt password) to a memory location to be retrieved later by TrueCrypt;

(5) If one of the PDs is entered (indicated by the decrypted data), the wiper immediately erases KH from TPM, and performs a quote to display the attestation string on the screen. It either halts the system or continues loading the decoy system according to user choice.

(6) The wiper switches the system back to real-mode, reinitializes it by mimicking what is done by BIOS at boot time, and replaces the handler of INT 13h.

(7) TrueCrypt MBR is executed, which decompresses the subsequent sectors from the hard drive into system memory. TrueCrypt also inserts its filter to the handlers of INT 13h and 15h. The corresponding volume is decrypted on-the-fly, if the TrueCrypt password (as received from the wiper) is correct. Then the boot record on the decrypted partition is chainloaded, and Windows is booted.

A.3.D Storing Gracewipe Components.

For booting the target system, Gracewipe's software components (GRUB, tboot, wiper, TrueCrypt MBR) can reside on any media, including any secondary storage. In our proof-of-concept system, we keep these components on a secondary USB storage. The target hard drive only contains TrueCrypt modules (except its MBR) and all encrypted partitions. All Gracewipe components can also be placed on the target hard drive alone, with additional effort, including: (a) an extra partition with file system is needed to store tboot and its modules; (b) GRUB MBR will overwrite part of TrueCrypt, and thus either of them must be relocated; and (c) TrueCrypt MBR must be modified not to read the TrueCrypt modules from their predefined locations (e.g., sector 2 of the disk).

A.3.E Sealing in NVRAM.

TPM specification mandate mechanisms against guessing attacks on password-protected NVRAM data (e.g., only a few passwords may be tested in a row). However, such mechanisms are inadequate for Gracewipe as the adversary has physical control and can patiently keep testing passwords, and user-chosen passwords tend to be relatively weak. The implementation of such mechanisms is also vendor-specific (see Section A.7). If the adversary would like to brute-force a specific index a few times until the chip is locked out and reset it with TPM_ResetLockValue, he may eventually succeed by automating the process.

To address this, we apply TPM's data sealing technique, so that if an altered software stack (i.e., anything other than Gracewipe) is run, the desired data will not be unsealed, and thus will remain inaccessible. Note that sealing does not disallow guessing from within the Gracewipe environment; however, as Gracewipe is active, each guess may unlock the hidden/decoy data, or trigger key deletion.

A 128-bit confounder C is generated at Gracewipe's initialization and sealed in an NVRAM index using PCR 17 (tboot's measurement) and PCR 18 (wiper and TrueCrypt MBR). Sealing ensures that C is never exposed outside the designated environment. Then each user-chosen password is hashed with SHA1 to 160 bits and truncated to 128 bits. The output is XOR'd with C and used as authdata secret to protect an NVRAM index storing the corresponding encryption key along with a deletion indicator; e.g., the authdata secret derived from PN is: $PN'=SHA1(PN) \oplus C$, where SHA1 output is truncated to the first 128 bits (PH' and PD' are derived in a similar manner). PN' is then used to protect KN concatenated with the deletion indicator, which is set only for the value protected by PD'. Now, without brute-forcing C, an attacker cannot launch a guessing attack on passwords; as C is a random 128-bit value, brute-forcing would be infeasible.

Note that, if we use passwords directly as authdata secrets (e.g., PN instead of PN'), even with sealing, passwords may still be guessed. Consider the following construction: use PN as the authdata secret to protect KN C concatenated with the deletion indicator. Without the sealed secret C, of course KN cannot be retrieved. However, by checking the TPM's response (success/failure) to a guessed authdata secret value, the attacker can learn PN and other valid passwords, without going through Gracewipe. To avoid this attack, we use PN' as authdata secret and use KN as the protected data.

A.4 Implementation with TrueCrypt

In this section, we discuss implementation details of Gracewipe with TrueCrypt under Windows. We also implemented Gracewipe with SED disks; see Section A.6. Side effects as observed from our implementation choices are discussed in Sections A.5 and A.7. Gracewipe involves primarily the wiper and some minor changes in TrueCrypt. Approximately, the wiper has 400 lines of code in assembly, 700 lines in C and 1300 lines of reused code from tboot.

Machine Configuration.

For our prototype system, we used a primary test machine with an Intel Core i7-37705 processor (3.10 GHz) and Intel DQ77MK motherboard, 8 GB RAM with 1 TB Western Digital hard drive. We also used another machine of similar configuration for verification of the TXT issue when switched back to real mode (Section A.5). In addition, a few non-TXT-enabled machines were also used for miscellaneous purposes (e.g., TPM deadlock problem and TrueCrypt testing).

A.4.A. TPM I/O Access

As discussed in Section A.3, the wiper must access the TPM at an early stage of system boot, i.e., right after GRUB and tboot. Most applications access TPM through the TCG software stack by calling a set of APIs provided by a library with a device driver, as part of the OS. However, at boot time, no such support is available (as in our case); thus, we must handle the communications between the TPM and wiper, and implement a subset of (complex) functionalities of the TCG software stack.

During our pre-boot wiper environment, there are three options for interfacing with a TPM.

(1) Port-mapped I/O (PMIO): It is the legacy way to connect various peripherals with the processor, and is available in both real and protected modes. However, it is not recommended for TPM communications as the port assignment can be vendor-specific.

(2) TCG BIOS: TPM functionalities may be accessed using a TCG-compliant BIOS, via INT IAh, and thus it works only in real mode. We do not use this method as Intel tboot/TXT requires protected-mode (more detailed in Section A.5).

(3) Memory-mapped I/O (MMIO): In the TPM 1.2 specification, interfacing with TPM of different vendors has been standardized to use MMIO (legacy I/O is supported for backward compatibility). MMIO, as opposed to port-mapped UO, uses the same address bus to address both memory and I/O devices. The devices are mapped to a range of memory and read/written as regular memory location (whereas PMIO requires special instructions such as IN and OUT). TPM by default is mapped to a region starting at 0xFED40000. This only works in protected mode, since it exceeds the boundary of memory access in real mode. As the wiper executes right after tboot releases control, where a full MMIO-based access to TPM is already initialized (in protected mode), we can reuse part of the TPM functions in tboot (e.g., status check).

A.4.B. Secure Storage in TPM

In addition to I/O interfacing, construction of packets (termed as message blobs) to communicate with TPM is another consideration as we are implementing our own protocol stack. Since tboot takes care of the measured launch, what we need in the wiper is mainly how to securely store/access the keys in TPM. Below, we briefly explain how to use TPM's secure storage and the way we store/access Gracewipe keys in TPM. In a few cases, we reverse-engineer TPM message blobs, due to the lack of adequate documentation.

TPM NVRAM memory is represented by an index number plus an offset. Indices must be allocated with certain protection, either through localities or with explicit authentication. Locality defines a specific context in which an operation takes place. TPM NVRAM operations are locality-sensitive. For instance, an index defined as read locality 0 and write locality 4 only permits data to be read out at 0 and written in at 4. Explicit authentication requires a secret to protect the index. It can either be the TPM owner password or a separately defined secret; here, we term the former case as owner access and the latter as authdata access.

There are three authorization levels defined to communicate with TPM: non-authorized, single authorized, and dual authorized command messages. Depending on the context and property of the command, one or multiple authorization levels may be required. There are three authorization tags, indicating which level the caller wants to establish: TCG_TAG_RQU_COMMAND, TCG_TAG_RQU_AUTH1_COMMAND and TCG_TAG_RQU_AUTH2_COMMAND. They are named literally according to the number of authorization blocks in the message; we refer them by non-auth tag, auth1 tag and auth2 tag, respectively hereafter.

Combining the aspects above, there are three options for storing the keys. (1) Locality-protected indices: As locality provides only weak protection bound to the context, keys must be encrypted before being stored in TPM, and thus requires adding another layer of complexity. (2) Indices with owner access: TPM owner password is shared for various functions and cannot be dedicated to specific indices. More importantly, as stated in Section A.2.C, the owner password can be reset easily, as the adversary has physical access. Therefore, this method is not secure at all for our key storage. (3) Indices with authdata access: A password as authdata can be set to protect each index; this is the option we choose to use.

However, authdata access is less straightforward, as constructing authenticated message blobs for TPM is complicated. The TPM specification provides enough documentation for operation procedures and data structures, but sometimes unexplained contextual information is needed for proper implementation of auth access commands (e.g., the usage of different types of authdata is not clearly stated, and often all zeros are used). To the best of our knowledge, in pre-OS projects such as TrustedGRUB and tboot, no realization for authdata accessed NVRAM interaction is available. TrustGRUB uses TCG BIOS calls in real-mode (it just needs PCR operations); tboot implements only TPM_NV_ReadValue( )/TPM_NV_WriteValue( )(with non-auth tag). We also explored the source code of the TCG software stack (TrouSerS) in Linux, which is written as a full-fledged implementation with several layers of abstraction and context-dependent branching. At the end, it was easier to reverse-engineer the packets (blobs) that we could observe through the debug mode of TrouSerS. We then checked the traffic to find inconsistencies that are not stated in the specification. Below, we discuss a particular undocumented example case:

How to execute the object specific authorization protocol (OSAP) to generate a shared secret, and use it to generate encAuth is mostly undocumented (calculation of encAuth is specified as depending "on the context"). It is vaguely mentioned in an example workflow of the specification. For instance, in the case of TPM_NV_DefineSpace command, we found that the NVRAM authdata (hashed) is used for encAuth, if the parameter size is non-zero; otherwise, a 20-byte value of all zeros is used (which implies releasing space). In both cases, the hashed owner auth is needed.

At the end, we implemented the following TPM functions in C: tpm_nv_read_value_auth( ), tpm_nv_write_value_auth( ), tpm_nv_define_release( ), rpm_loadkey2( ), tpm_quote2( ); We reused most other functions from tboot.

A.4.C. Measured Launch with Tboot

The root of trust measurement in Gracewipe is based on and implemented with tboot. Here, we briefly describe important links in our chain of trust. The correct measurements of Gracewipe binaries are stored in TPM NVRAM as policies. The policies are written to indices with owner write access and enforced at boot time. They must be generated in the configuration phase, when it is assumed that the environment is malware-free. In tboot terminology, there are two types of policies: MLE policy (Intel TXT policy) and custom policy (tboot verified launch policy). The MLE policy can take into account the software stack required to prepare for TXT execution (see Section A.4.D). When all the modules in the MLE policy have been verified in TXT, tboot is re-entered and ready to perform its own measurement (custom policy). The tboot binary is included in the MLE policy and our wiper with embedded TrueCrypt MBR is defined in the custom policy. Tboot must be loaded with GRUB or a similar multiboot-compliant loader. We add entries for Gracewipe binaries in GRUB's menu.lst file (stored on a USB disk, simulated as a floppy (fd0)). In tboot's command line parameters, we add up_wake_mwait=true to deal with some TXT shutdown issues (see Section A.5.D).

A.4.D. Attestation with TPM Quote

For verifying the deletion of KH, the measurement of the executed code must be conveyed in a trusted way, e.g., via a TPM quote. A quote operation involves generating a signature on a requested set of PCRs, and a verifier-provided nonce with TPM's attestation identity key (AIK). As we assume that both the identity of a TPM and the measurements of Gracewipe software stack are verifiable with public information, the integrity of the deletion process can be guaranteed by verifying the quote result. Below, we discuss issues related to quote generation and verification in Gracewipe.

Human-Initiated Attestation.

During the quote generation, the adversary's participation in selecting a nonce is required to prevent replay attacks. We consider two sources for the nonce: (1) A timestamp (hashed for the same output length) used in quoting may convince the verifier that the quote is fresh. Gracewipe displays the timestamp used, and the verifier can write down the short timestamp for later verification, and match it with a separate clock. (2) We also implement a more direct method to prompt the verifier for an arbitrary string and use the hashed string as the nonce; this requires active involvement of the verifier.

Generating the Quote.

As an advantage of the "late launch" with Intel TXT, we only need to take into account everything after the trusted execution starts, i.e., the authenticated code module (SINIT ACM) together with some static fields (PCR 17), and the measured launch environment (MLE, PCR 18). Therefore, the known good measurements are only determined by a limited number of Intel published ACMs (processor-specific), tboot and Gracewipe.

Note that we do not have to use either auth1 or auth2 tags, as no authentication is needed to generate a quote; so we just used the non-auth tag. However, loading the signing key requires an object-independent authorization protocol (OIAP) session with the storage root key (SRK) password. In the end, we write the 256-byte quote value into an NVRAM index and also display it on the screen.

Transferring the quote. With Gracewipe, the adversary must "offload" the quote from the victim's computer as he cannot perform an in-place verification. A straightforward way is to display the quote on the screen for the adversary. We considered using QR code so that he can scan it with a smartphone-like device. But we refrained from doing so because it requires Gracewipe to enter in graphics mode. Instead, we store the quote into a predefined NVRAM index (with no password protection). The adversary can access it at a later time from the victim's computer. He can boot into an OS to perform the verification on his own. We also display the quote on the screen for a diligent adversary for matching purposes.

A.4.E. Changes in TrueCrypt

To make TrueCrypt aware of Gracewipe, we make some changes in TrueCrypt. We keep such changes to a minimum for easier maintenance and deployment. Our changes are mostly in BootLoader.com.gz (BootMain.cpp, 9 lines added in assembly, 6 lines added in C), and a few minor changes in BootSector.asm. In BootSector.bin, the integrity of the rest of TrueCrypt modules (including the decompressor) is first verified. It calculates only the checksum (CRC32) due to the small footprint of MBR. The checksum is generated at install time and when we make any changes, we have to update the corresponding checksum in the configuration area (part of the 512-byte MBR). During development, we flipped the corresponding bit to disable it, In BootLoader.com.gz (TrueCrypt modules), the modifications are mainly for receiving decrypted passwords (treated as keys in Gracewipe) from the wiper without user intervention. As an interchange between the wiper and TrueCrypt, we use a hard-coded memory location (0x0000: 0x7E00, an address following the wiper, and not foreseeably used).

A.4.F Wiper Initialization

Before Gracewipe can function properly, some initial setup must be performed in addition to initializing the platform (e.g. taking TPM ownership and installing True-Crypt), Such initial setup involves both the host OS and Gracewipe.

Preparation in the Host OS.

A script that works with the TrueCrypt installer must automatically generate a strong key (i.e., random and of sufficient length) to replace the user-chosen password. This is done for both KN and KH. Then the user must copy (manually or with the help of the script) KN and KH to be used with Gracewipe. She must destroy her copies of the two keys after the setup phase.

Preparation in Gracewipe.

Gracewipe comes with a single consolidated binary with two modes of operation: deployment and normal. Modes are determined by the value (zero/non-zero) in an unprotected NVRAM index; note that, reinitializing Gracewipe has no security impact (beyond denial of service (DoS)), but still a simple password can be set to avoid inadvertent reset. If the value is non-zero, normal mode is entered; otherwise, Gracewipe warns the user and enters the deployment mode. In the deployment mode, the wiper first clears out the three NVRAM indices corresponding to PN, PH, and PD, then it uses the random number generator in TPM to generate a 128-bit confounder C and seals it with the current environment measurements into an NVRAM index. The user is then prompted for the three passwords (PN, PH and PD) of her choice and the two keys (KN and KH) generated on the OS. The wiper XORs C with the hashed passwords, and uses the output to secure the three indices for storing KN and KH (see Section A.3). In the end, the wiper toggles the mode value for the next time to run in the normal mode.

A.5 Loading Windows after Tboot

In this section, we discuss some side effects caused by loading Windows after running tboot and possible solutions. Parts of them have been verified and can be applied to other similar systems with certain adaptation, while some may be too specific to our test machines.

A.5.A. Observations

Loading Windows after TXT (as opposed to Linux/Xen) causes issues in two aspects:

At boot time, the system must be switched back to real mode (from tboot's protected mode), as Windows assumes that it starts at system reset (chainloading). Specifically, Windows invokes BIOS interrupts for the most part of its initialization. In contrast, Linux has both real/protected-mode entries, and is multiboot compliant.

As Windows is closed-sourced, it cannot be adapted to be TXT-aware, as opposed to Linux (e.g., via a simple flag, CONFIG_INTEL_TXT).

As of writing, we are unaware of any projects or products that involve entering TXT and thereafter switching back to real-mode, not to mention invoking BIOS interrupts therein. According to Intel's documentation, we can infer that TXT is not intended for use in real-mode or preserving the functionality for real-mode. Our observation is when the MLE is launched successfully, and by the time our wiper chain loads the TrueCrypt boot record, no matter whether the system is still in TXT or has exited TXT, some I/O related BIOS calls do not function properly. The root cause appears to be DMA-related as observed from our two test machines (see Section A.5.E); however, we could not confirm this from TXT documentation.

One of the symptoms of BIOS issues is that a disk read operation with INT 13h returns an error code of 80h (which means timeout), as tested with BIOS version 56P or below (Intel DQ77MK motherboard). A system halt may also occur with BIOS version 60. The problem appears to be non-deterministic. As the rest of the binaries we need to load all rely on calling INT 13h (TrueCrypt MBR, TrueCrypt modules, BootMgr. and winloadexe), we could not proceed without restoring such BIOS functionality.

Also, tboot is not designed for chainloading, and as we observed, the presence of tboot as part of the loading chain makes the environment incompatible with Windows. In the rest of this section, we discuss our fixes to the above mentioned Windows specific problems.

A.5.B. Rewriting BIOS Interrupt Handler for Disk Access

We re-implement parts of the BIOS interrupt handler that must be available until the point when Windows is fully initialized, more precisely, until the TrueCrypt device driver takes control.

For simplicity, we use the programmed input/output (PIO) mode of the commonly accepted ATA specifications. Without BIOS support, disks can still be accessed through writing to and reading from a group of special I/O ports in a designated sequence. The completion of an operation can be signaled by triggering an external interrupt, or by polling the status register. We avoid involving another layer of interrupt, and use the polling mechanism instead.

There are two access modes that should be supported in the INT 13h handler. CHS (Cylinder, Head and Sector) is a legacy method of accessing hard disks. The caller must be aware of the geometry of the disk being accessed. Most boot-time programs (e.g., Windows VBR and GRUB stage1) use this mode for simplicity and backward compatibility. By default, INT 13h uses CHS (function codes starting with zero, e.g., 0x02 and 0x03). LBA (logical block addressing) is a more recent, widely-used linear addressing scheme; the location of blocks of data is represented by a single integer regardless of the actual geometry of the disk. In reality, after the initial stage, most bootloaders switch to LBA, if it is supported by the device (which is common nowadays). To also simulate LBA, we need to add support for INT 13h Extensions (function codes starting with 4, e.g. 0x42 and 0x43).

We provide the required INT 13h functionality by translating the BIOS-formatted read/write and other requests into the representation of ATA PIO specifications in assembly. This covers eight functions of INT 13h with an approximate code size of 350 lines in assembly; the functions are: read drive parameters (0x08), read/write sectors from/to drive (0x02/0x03), check extensions present (0x41), extended read/write sectors from/to drive (0x42/0x43), extended read drive parameters (0x48) and read disk/DASD type (0x15). We observed that function code 0x15 is used by winload.exe as a shadowed BIOS call, which is surprising as BIOS interrupt handlers are invalidated in protected mode and Windows kernel should not use them.

A.5.C. Memory Overlaps

A problem we frequently encountered is system crash, caused by memory access violation due to memory overlaps between tboot and Windows. Below, we discuss such access violations and how we fixed them.

Windows is loaded by TrueCrypt modules at memory address 0x0OOO:0x7C00, when the desired volume has been decrypted. However, Windows is totally unaware of tboot, and the memory layout used by Windows is also unavailable to us. We observed that when tboot is removed from Gracewipe, Windows can start up successfully; however, if tboot is included for a measured launch, Windows crashes while loading device drivers in winload.exe. By checking the debug information (in safe mode), we could not identify a specific offending module. Then we employed a manual technique: from Windows boot manager we chain-loaded GRUB4DOS, where we gradually shrunk a zeroed region using mem_set( ) and identified an overlapped memory region between tboot and Windows.

By default, tboot sets its starting address at 0x00800000, and reserves its space in the E820 table. However, Windows seems to use a region that overlaps part of the tboot binary, as observed via Windows boot debugger (a mode of windbg for debugging Windows BootMgr): Primary image base=0x0086b000 Loaded module list=0x009051040. This overlaps the range of 0x00800000-0x00AC7000, the first section reserved by tboot and causes access violations, leading to system crash.

Workaround.

We first tried with the Windows boot configuration data (BCD) file, which provides two sets of parameters that affect Windows memory allocation. (1) AvoidLowMemory restricts the use of memory below the specified value by the bootloader, but we could not verify the effectiveness of this parameter. (2) BadMemoryList marks a list of memory page frames (4K) as bad, and setting BadMemory-Access to NO prevents access to bad pages. BadMemoryList entries are enforced by the Windows memory manager that resides in Ntoskrnl.exe. However, Ntoskrnl.exe is loaded midway in winload.exe and thus the enforcement comes too late (as before Ntoskrnl.exe, other modules are already loaded). In fact, the region where tboot resides is accessed before the memory manager takes control.

We then tested an ad hoc method with success. We assume that Windows does not use the range starting at 0x08000000 (i.e., 0x00800000 multiplied by 16), at least before it is fully initialized. In tboot's config.h file, we changed TBOOT_BASE_ADDR from 0x00800000 to 0x08000000 and TBOOT_START from 0x00804000 to 0x08004000. This shifts the whole tboot binary up to a much higher location in memory, and thus avoids the overlap.

A.5.D. Shutting Down TXT

For secure deletion, we require TXT protection only for the Gracewipe environment. As Windows is TXT unaware, we must tear down the TXT session when leaving the wiper; this can be easily done by calling GETSEC[SEXIT]. However, simply executing this instruction before loading TrueCrypt MBR crashed the system. We briefly explain the reason and a simple solution to it.

In a multi-core environment, application processors (AP) are waken up on demand by the OS, when the bootstrap processor (BSP) finishes initialization. In our case, we simply bootstrap the system and run the wiper on the BSP, and without making use of (waking up) any APs by scheduling an OS/VMM, we switch the system back to its initial state. Thus, when trying to shutdown TXT at this point, while we have 7 APs in the Wait-for-SIPI (WFS) state, SEXIT causes a system reset; this is not so unexpected as mentioned in the tboot documentation.

To avoid dealing with the state of WFS, we make use of the MWAIT feature available in current CPU models. GETSEC[SEXIT] can work if the APs are still in MWAIT. Thus TXT is safely (from the CPU's perspective) torn down, and the wiper can continue to run. To enable this feature, we only need to append a switch to tboot parameters: ap_wake_mwait=true.

A.5.E. Additional Disk Access Issues

As our custom INT 13h handler only supports parallel ATA (PATA/IDE), and our machine comes with only SATA controllers (as most off-the-shelf PCs), we manually change the mode of SATA controllers from AHCI to IDE in the BIOS setup. If Windows is installed with AHCI, modifying the registry to use pciide.sys instead of msahci.sys is needed.

Even with all the above modifications, our Windows booting still failed with UNMOUNTABLE_BOOT_VOLUME (0x000000ED). The reason code of 0xC000014F indicates a disk hardware problem, which cannot be true as we could boot Windows without the tboot MLE. We found that the logic of the call stack for INT 13h was apparently correct, but the returned data contained seemingly random bytes. We suspected the data transfer mechanism in Windows disk driver as a possible reason. By checking the default mode of the corresponding ATA channel, we found it was in "Ultra DMA Mode 5". We changed the ATA channel to use the "PIO" mode and restarted the system. We could see that the driver returned the correct data, and Windows booted successfully. For the same reason, we suspect that the original INT 13h handler also relies on DMA to communicate with hard drives (but could not confirm from the manufacturer's documentation).

A.6. Implementation with SED

Our Gracewipe prototype for TrueCrypt with hidden volume support is an example of Gracewipe's applicability for a PDE-FDE system. To show that Gracewipe's design is easily adapted to support hardware-based FDE, we implement Gracewipe for a Self-Encrypting Drive (SED). This implementation shares several parts with the TrueCrypt prototype. In this section, we discuss the parts where our SED implementation differs from the basic architecture (Section A.3) and the TrueCrypt implementation (Sections A.4 and A.5).

A.6.A. Gracewipe on SED

Here we replace TrueCrypt passwords with an ATA security user password, which is actually a high entropy key (referred as ATA key). Note that there is no hidden volume with the SED-based Gracewipe. In the deployment mode, the user is prompted for the ATA key (as KH) and the user-chosen passwords (PH for KH and PD for deletion). Both PH and PD are hashed and XOR'd with a sealed confounder (C) and used to protect the ATA key in TPM NVRAM. In the normal mode, the correct password PH decrypts KH from TPM, and KH unlocks the drive by decrypting MEK. If one of the PDs is entered, Gracewipe erases KH and goes through the same quoting process as explained in Section A.4.D.

We did not use vendor-specific APIs, e.g., Seagate's DriveTrust, to operate on MEK to achieve cryptographic deletion. Since MEK is encrypted with a key derived from the user password (KH), erasure of KH disables access to MEK, and hence makes all the data protected by MEK inaccessible. We note that the ATA Security API as we use for the password interaction, is available on most password-protected drives.

However, as user data is unencrypted on regular password-protected drives, as emphasized in Section A.2.C, we mandate only SEDs to ensure that when the ATA key is erased, the user data remains encrypted with no key to decrypt.

A.6.B. Implementation

Recall from Section A.5.B that when rewriting the INT 13h handler, we communicated with ATA compliant drives through I/O ports by sending commands and receiving responses (PIO read_ext/write_ext 0x24/0x34). For unlocking ATA security, we choose the same approach (with command 0xF2). In the wiper, before switching back to real-mode, when the correct ATA key is decrypted from TPM, we provide it to the hard drive as if it is entered by the user. This is equivalent to typing the password when prompted by BIOS at boot time.

The deletion and quoting occur before any interaction with the ATA interface, and are therefore independent of the newly added functions. This is how a similar framework can be kept for SED-based implementation as with the True-Crypt-based one. Since unlocking occurs in protected-mode, there is no data to be passed to the chainloading part of the wiper. Instead, we retrieve the first sector of the unlocked disk (in place of the TrueCrypt MBR) to simulate the behavior of a regular BIOS that performs chainloading. The same context for loading Windows is also created (e.g., rewritten INT 13h handlers and disabled DMA). We were able to boot up Windows, and the SED-based implementation required adding only about 80 lines of code to the TrueCrypt prototype.

A.7. Limitations

Below, we summarize limitations originating from our somewhat unusual way of leveraging TPM/TXT technologies.

A.7.A Degraded Disk I/O without DMA.

As discussed in Section A.5, switching back from TXT into real-mode affects DMA functionality. At this point the inventors have partially identified the root cause, which we believe is Windows memory mapping being unaware of TXT, and it is not easy to customize Windows for such mapping due to the unavailability of Windows source code. As a temporary fix, we turned off DMA in Windows. Therefore, the system performs slower as in any other case when DMA is disabled. Note that this particular DMA issue is unrelated to Gracewipe's design and thus can be easily avoided. We have successfully booted up Linux with Gracewipe in TXT without any DMA problems. Gracewipe in itself is a boot-time tool, which does not run along-side the user OS.

A.7.B TPM Deadlock.

By design, TPM NVRAM is intended to provide secure storage and protected access to confidential data. Nevertheless, such protection (especially that with authdata access) is unsuitable to be used as a general purpose encryption/decryption oracle: the key difference is that a program accessing NVRAM is expected to supply the correct authdata secret, and a failed attempt is considered as part of a guessing attack or an anomaly. For a general decryption oracle, online guessing is a non-issue, i.e., a wrong key will generate random output but no anomaly is recorded.

As we attempt to consecutively access one to three NVRAM indices with the same user password, i.e., until we can unlock a key or fail at all three authdata-protected indices, we effectively treat NVRAM authdata protection as generic decryption. Therefore, TPM actually counts each failed attempt as a violation and may enter a lockout state where TPM will not respond to subsequent operations until an explicit reset or timeout occurs; for details, see under dictionary attack considerations in the TPM specification. TPM vendors are required to provide "some protection" against such attacks, and actual mechanisms are vendor specific whilst more robust counter measures have also been proposed within the prior art.

Therefore, no universal fix can be applied for the NVRAM deadlock. TPM_ResetLockValue may be used to reset the fail counter, and temporarily put TPM back to normal; we are however, unsure of any negative effects of issuing this command too often. As observed, our TPM chip (Winbond, chip version: 1.2.3.69) behaves as follows:

If the TPM chip is in a fresh state (i.e., no recent failed attempts), or it has been reset using TPM_ResetLockValue, we see more tolerance to failed attempts (the number is between 10 and 20).

If the TPM chip was in a lockout state, but automatically recovered because of the timeout (approximately 10-20 minutes), it can tolerate only one failed attempt before getting into lockout state again.

We relied on TPM_ResetLockValue and time-out during our development. On the positive side, the anti-guessing mechanisms raise the bar for the adversary, if he wants to mount a dictionary attack on Gracewipe passwords (of course, with the existing risk of entering the deletion password).

A.8. Security Analysis

In this section, we extend the discussion from Section A.2.C, and analyze possible attacks that may affect the correct functionality of Gracewipe. Note that, the verifiability of Gracewipe's execution comes from a regular TPM attestation process. Since the good values (publicly available) only rely on Intel's SINIT modules, tboot binaries and Gracewipe, as long as the PCR values (via quoting) are verified to match them, it can be guaranteed that the desired software stack has been run.

A.8.A. Attacks on TPM.

Although TPMs offer some physical tamper-resistance, they have been successfully attacked in the past. As Gracewipe relies on TPM, such attacks may affect its functionality. In a TPM reset attack, a TPM's LRESET pin is grounded, which causes a hardware reset and thus reinitializes PCR values without rebooting the computer. This exploits the low speed of the LPC bus. It has been verified with SRTM but no proof of effectiveness can be found yet with DRTM. If feasible, it may have two impacts. (a) The adversary will be able to attest to any forged Gracewipe binary as genuine due to the PCR values of his choice. However, as he is the verifier in this scenario, he has no incentive to do so. (b) The attacker can also unseal C (with the forged correct measurements). This allows him to mount an offline dictionary attack against PH/PD/PN, equivalent to when no C is used.

TPM pins can also reveal the data being transferred, if not encrypted. In TPM 1.2, encrypted communication is supported; however, metadata and command ordinals are still in the clear text. Therefore, the adversary may detect the deletion attempt (by filtering certain commands) and interrupt it, e.g., cutting the power, or punish the victim. This attack can be addressed in two ways: use a TPM chip that does not expose pins to probing (e.g., integrated TPM in SuperIO); or, perform an NVRAM write (as required in our deletion operation). Each time a password is entered, i.e., effectively making Gracewipe always behave the same on all entered passwords.

A.8.B. Evil-Maid Attacks.

In 2009 it was demonstrated that the possibility of an evil-maid attack (also termed as bootkit) against software-based FDEs existed. The key insight is that the MBRs must remain unencrypted even for FDE disks, and thus can be tampered with. We consider two situations directly applicable to Gracewipe: 1) In normal operation (i.e., not under duress), the user may expose her password for the hidden system (PH). As soon as such an attack is suspected (e.g., when PH fails to unlock the hidden volume), users must reinitialize Gracewipe, and change PH (and other attempted passwords); note that, the user is still in physical control of the machine to reset it, or physically destroy the data. 2) Under duress, we assume that the user avoids revealing PH in any case. However, the adversary may still learn valid PN/PDs as entered by the user without the risk of losing the data (due to the lack of Gracewipe protection). The use of multiple valid PDs can limit this attack. Note that if an attacker copies encrypted hidden data, and then collects the hidden password through an evil-maid attack, the plaintext data will still remain inaccessible to the attacker due to the use of TPM-bound secrets (see under "Sealing in NVRAM" in Section A.3). The attacker must steal the user machine (at least, the motherboard and disk) and launch the evil-maid attack through a look-alike machine. Existing mechanisms against evil-maid attacks, e.g., STARK and MARK can also be integrated with Gracewipe.

A.8.C Attacks on SED.

It has been shown that several existing attacks on software-based FDEs (e.g., DMA-based, cold-boot, and evil-maid attacks), and show that these attacks are still effective against SED disks. This work also identified a new, simple hot plug attack that can be summarized as follows. As SED conforms to the legacy ATA security standard, an SED drive is in a status of either locked or unlocked. When unlocked, although data is encrypted (write) and decrypted (read) on the fly, the output is always plaintext; thus, as long as the power cable is connected, the drive is never relocked, and accessible through another computer's SATA connection. This attack may succeed even when the victim computer is in a standby mode. Therefore, we mandate shutting down the computer before entering a possibly coercive environment.

Another possible attack is capturing the clear text ATA password from the IDE/SATA interface. The password may be extracted by probing the interface with a logic analyzer. In a coercive situation, the user is expected only to enter the deletion password, which will erase the TPM-stored ATA password, instead of sending it to the IDE/SATA interface.

A.8.D Undetectable Deletion Trigger.

As discussed under "Sealing in NVRAM" in Section A.3, sealing prevents guessing attacks without risking key deletion. Sealing also prevents an attacker from determining which user-entered passwords may trigger deletion, before the actual deletion occurs. If the adversary alters Gracewipe, any password, including the actual deletion password, will fail to unseal the hidden volume key from NVRAM. Since the deletion indicator (i.e., a special bit/index) lies only within the sealed data in NVRAM, the adversary will be unable to detect whether an entered password is for deletion or not (e.g., by checking the execution of a branch instruction triggered by the deletion indicator).

A.8.E Quoting for Detecting Spoofed Environment.

In the current implementation of Gracewipe, we only generate a quote in the case of secure deletion. However, in normal operations, the user may want to discern when a special type of evil-maid attack has happened, e.g., when the whole software stack is replaced with a similar environment (e.g., OS and applications). For this purpose, we can generate a quote each time Gracewipe is run and store it in NVRAM. By checking the last generated quote value, the user can find out if Gracewipe has been altered or not. In both secure deletion and normal operation, the selection of a proper nonce is of great importance. We currently support both arbitrary user-chosen strings and timestamps. Nevertheless, the use of a timestamp is susceptible to a pre-play attack, where one party can approximately predict (especially, if the other party is not paying attention) the time of the next use, and pre-generate a quote while actually running an altered binary This is feasible because the malicious party has physical access, and thus, is able to use TPM to sign the well-known good PCR values for Gracewipe and the timestamp he predicts. Therefore, for spoofed environment detection, we recommend the use of user-chosen strings during quote generation, although it requires user intervention.

A.8.F Booting from Non-Gracewipe Media.

The attacker may try to bypass Gracewipe by booting from other media. For an SED-based implementation, such attempts cannot proceed (i.e. the disk cannot be mounted). Even if he can mount the disk, e.g., with a copy of Gracewipe-unaware TrueCrypt, he must use the unmodified version of Gracewipe to try passwords that are guessed or extracted from the user (e.g., under coercion), as TrueCrypt volumes are now encrypted with long random keys (e.g., 256-bit AES keys), as opposed to password-derived keys. Brute-forcing such long keys is assumed to be infeasible even for state-level adversaries.

A.8.G User Diligence.

It is important users understand how security goals are achieved in Gracewipe, and diligently choose which password to use depending on a given context. If the deletion password is entered accidentally, the protected data will be lost without any warning, or requiring any confirmation. Note that, we do not impose any special requirement on password choice; i.e. users can choose any generally-acceptable decent passwords (e.g., 20 bits of entropy may suffice). We do not mandate strong passwords, as the adversary is forced to guess passwords online, and always faces the risk of guessing the deletion password. Also, the user must reliably destroy her copy of the TrueCrypt keys or ATA keys when passing them to configure TrueCrypt or SED devices. We can automate this key setup step at the cost of enlarging the trusted computing base. However, we believe that even if the whole process is without any user intervention, the adversary may still suspect the victim to have another copy of the key or the confidential data, Here, we only consider destroying the copy that the adversary has captured.

A.9 Improvements in Design and Implementation of Gracewipe

A.9.1 Alternative to Sealing a Confounder C

The following construction makes the design in Section A.3.E simpler to implement, without sacrificing security. Instead of directly sealing the keys into NVRAM, we make use of the access-control-based PCR binding to achieve the same goal. When an NVRAM index is defined, selected PCRs are specified as the access requirement in addition to the user password (authdata). The stored key can be accessed only if both the password and the PCR values (correct environment) are satisfied. This design choice prevents offline guessing of user passwords protecting the sealed keys, as opposed to the following construction: use PN as the authdata secret to protect KN stored in NVRAM in its sealed form. Without the correct environment, KN cannot be unsealed. However, by checking the TPM's response (success/failure) to a guessed authdata secret value, the attacker can learn PN and other valid passwords, without going through Gracewipe; the attacker can then use the (guessed) valid passwords in Gracewipe to unlock corresponding keys. With our current construction, TPM will output the same failure message, if either PCR values or passwords are incorrect.

A.9.2 Password Management

Under the strong adversarial model in Gracewipe, the user (e.g., a security personnel) is expected to properly maintain the configured passwords, and if they are lost the recommended solution is redeployment; i.e., there must be no password recovery. The data or keys protected under Gracewipe must not be backed-up in any Internet-accessible storage under any circumstances; this will enable easy coercion even after a successful local deletion. However, password update can still be supported; we propose a simple mechanism below.

At the same password prompt where the user normally unlocks the system at boot-time, password update mode can be triggered by using a special key sequence (e.g., "Ctrl+ Enter" instead of the regular "Enter" key). The received password is first handled by the deployed deletion triggering scheme, i.e., deletion will be initiated if PD is typed. After the password update mode is entered (i.e., deletion is not triggered), the user is prompted to enter an existing password to be changed (PH/PN/PD), and then type the new password twice. Gracewipe will try to access indices one by one until a success and replace the protecting password with the new one. Note that in order not to reveal any further information in the password update mode, no explicit feedback is provided, i.e., merely "Update process is done!" is displayed regardless of a successful update or failure. Also, a random delay can be added so that timing characteristics do not help distinguish valid passwords. We have implemented this scheme.

A.9.3 Addressed Limitations in Section A.7

The disk performance limitation from Section A.7.A has been addressed by disabling IOMMU PMRs.

The TPM deadlock limitation from Section A.7.B has been addressed by the DL-distance and pattern-based Gracewipe-XD schemes (see Section A.9.4), where the secret data to compare with is unsealed from NVRAM and the user-typed password is not used as authdata (thus no failed authentication to access NVRAM).

A.9.4 Gracewipe-XD: Extended Unlocking Schemes

In the basic version of Gracewipe, only one or a few predefined PDs are allowed. In this section, we discuss password-based deletion triggers to avoid limitations of the basic Gracewipe design (see below). We adapt some existing schemes and explore new ones, and implement the most promising variants.

Limitations of Few Deletion Passwords:

(1) The adversary's risk in guessing passwords is rather low. One or a few deletion passwords represent a very small fraction of a large set of possible passwords, e.g., millions in the case of brute-forcing, or at least hundreds, in the case of a small dictionary of most frequent passwords. (2) In terms of plausibility, the user is left with too few choices when coerced to provide a list of valid passwords; passwords other than PN, PH or PD will unlock no system nor trigger the deletion, and generate an error message. The adversary may choose to punish the user for any invalid password. With three valid passwords, the attacker's chance of guessing PH is at least 1/3 (although the risk of triggering deletion is also the same).

A.9.4.A Existing Panic Password Schemes

We summarize several existing panic password proposals (primarily for Internet voting, see Clark and Hengartner, "Panic passwords: Authenticating under duress", USENIX Workshop on Hot Topics in Security 2008), and analyze their applicability in our threat model (client-only).

2P:

The user has a regular password (in our case, PH) and a panic password (in our case, PD). The 2P scheme applies to situations where authentication reactions are unrecoverable; e.g., if PD is entered in Gracewipe, further adversary actions cannot help data recovery, as the target key KH is now permanently inaccessible. However, if the attacker can extract both passwords from the victim, the chance of triggering deletion/panic is 1/2; for 3P, the chance is: 2/3, and so on. This has both the aforementioned limitations.

2P-Lock:

When the reactions are recoverable, i.e., after PD is entered, knowing PH is still useful for the adversary (unlike Gracewipe), the adversary may continue guessing until he finds PH, but is bound to a time limit to end coercion (e.g., for escaping). In this case, a lockout mechanism can be applied to allow only one attempt, and make the two passwords indistinguishable. If a valid password is entered, the system always behaves the same (the panic passwords would signal coercion silently); then within a specified period, if a second valid but different password is used, the system locks out for a period longer than the adversary's time limit. However, 2P-lock is ill-suited for Gracewipe as there is no trusted clock to enforce the lockout (the BIOS clock can be easily reset).

P-Compliment:

This scheme is applicable against persistent adversaries (i.e., reactions are recoverable and no time limit for coercion). Instead of having a limited number of panic passwords, any invalid password (i.e., other than the correct one) can be considered a panic password. This simple rule will result in user typos to trigger unwanted panic/deletion.

To alleviate, passwords that are close to the correct one (i.e., easily mistyped) can be considered invalid (instead of panic), and thus the password space is divided into three sets based on edit distance: the correct password, invalid passwords and panic passwords. The user can now provide a large number of panic passwords, and typos are tolerated. Note that for a persistent adversary, it is assumed that there is no fatal consequence when a panic password is used (e.g., as in the case of online voting, the account is locked for a while). Thus, if the panic password and invalid password spaces are not well mixed, the adversary can try to approximate the boundary between them with multiple attempts. In Section A.9.4.C, we discuss a Gracewipe variant derived from P-Complement.

5-Dictionary:

For better memorizability, a user can choose 5 words from a standard dictionary, using a password space division similar to P-Compliment: any 5 words in the dictionary other than the user-chosen ones are considered panic passwords; any other strings are invalid. This scheme tolerates user typos and provides a large set of panic passwords. However, the number of panic passwords (nP5, for a dictionary of n words) could still be much smaller than the invalid ones.

5-Click:

For image-based schemes, any valid region in an image (excluding parts used for the correct login) can be used to communicate the panic situation. Current Gracewipe prototypes use text passwords, but they can be easily adapted to accommodate graphical/image-based authentication schemes and other secrets without any undue experimentation. Replacing text passwords with graphical password, cognitive password, security tokens, and other secrets is obvious to a person skilled in the art of general computer security.

A.9.4.B Counter-Based Deletion Trigger

We design a counter-based mechanism by adapting 2P-lock to limit adversarial iterative attempts without increasing the risk of accidental deletion (by user). Reaching the limit of failed attempts is used to trigger deletion, instead of locking out the system. Below, we provide the design and implementation of this adapted scheme.

Design:

We keep the functionality of PD/PH/PN as in the basic Gracewipe design, i.e., entering PD will still initiate an immediate deletion. In addition, we now count the number of invalid attempts (i.e., entry of passwords other than PD/PH/PN), and use the counter value as a deletion trigger when a user-defined preset threshold (e.g., 10) is reached. The counter must be integrity-protected—i.e., can be updated only by the correct Gracewipe environment.

An important consideration is when to reset the counter value. Because a legitimate user may also mistype sometimes, and as such errors accumulate the deletion will be triggered eventually. We consider two options for resetting the counter value: (i) Timeout: It is mainly used in online authentication systems. However, without a reliable clock source, it is inapplicable to Gracewipe. (ii) Successful login: Assuming that typos are relatively infrequent, a legitimate user will successfully login before the threshold is reached. We use such login to reset the counter. Note that only the entry of a valid PH is considered a successful login (but not PN, which can be revealed to the adversary when needed).

Implementation:

This scheme is implemented by simply adding checks to where the entered password has failed to unlock any indices and where KH is successfully unlocked. The counter value is sealed in a separate NVRAM index with the environment measurements. We also bind the measurements to both read and write access of this index so that a modified program cannot even read it, not to mention updating. At deployment time, the counter is initialized to 0. A user-specific trigger value is secured the same way as the counter (i.e., no access outside the correct Gracewipe environment). If the adversary tries to reset either of them by re-initiating Gracewipe deployment, he will have KH erased first before both values are reset. The logic is as follows: Any invalid passwords will increment the counter; entry of PN does not affect the counter; entry of PH will reset it to 0. Whenever the counter value is equal to the trigger value, deletion is initiated.

A.9.4.C Edit-Distance-Based Password Scheme

The counter-based deletion trigger can severely limit guessing attempts. However, if the user is forced to reveal all valid passwords, the attacker's guessing success rate will increase, due to the limited number of valid passwords (PN and few PDs). We design the following variant to counter both threats.

Design:

Following the P-Compliment scheme, we use edit distance to divide the password space. Instead of predefined PD/PH/PN, we develop a rule to determine which category the password falls into during authentication. There will be no invalid passwords any more, and actions are taken silently (unlock the hidden system, decoy system, or trigger deletion).

We must balance between the risk of user typos and the coverage of passwords the adversary may guess. To measure the closeness between two passwords, we use edit distance: the number of operations (edits) required to convert one string to another. By centering to user-defined PH, we can treat the rest of the password space according to edit distance. The farther a password is from PH, the more likely it is entered by the adversary, and vice versa.

There are different variants of edit distance metrics, mostly depending on the types of allowed edit operations (e.g., insertion, deletion, substitution, and transposition). These metrics usually provide similar performance in distinguishing strings but with various computation complexity (less critical for Gracewipe). We use the Damerau-Levenshtein distance (DL-distance), which considers only the following operations: insertion (one character), deletion (one character), substitution (one character) and transposition (two adjacent characters).

The choice of edit distance metrics may also involve other considerations. For example, we can take into account cognitive aspects (e.g., words with interchangeable meanings or user-specific typing habits), and device/physical aspects (e.g., common keyboard layouts). Especially, the CapsLock key must be checked, which can lead to large edit distance even when the correct password characters are typed, and convert all characters into lower case before processing. If such aspects are parametrized, a training process can also be introduced to customize Gracewipe-XD for a specific user.

If we denote the entered password as PX, the overall logic is as follows: if DL-distance (PX, PH) is less than or equal to Threshold1, PH is received; if DL-distance (PX, PH) is greater than Threshold1 but less than or equal to Threshold2, then PN is received; otherwise, PD is received, which triggers the deletion process (including quote generation). We convert both PX and PH into lowercase for the DL-distance calculation (to avoid accidental CapsLock on status).

Note that, using DL-distance, multiple PHs can be allowed to access the hidden volume (e.g., by allowing Threshold1 to be greater than 0). However, the usability benefit may be insignificant, as the range has to be centered to one PH, and thus forgetting PH may also indicate not remembering those that are only one or two characters different. On the other hand, allowing multiple PHs will increase the adversary's guessing probability (PHs cover more in the guessable space). At the end, we kept Threshold1 to 0, i.e., a single PH is used.

In contrast to P-Complement, password spaces for PN and PD may not need to be well-mixed in our variant. However, we still re-examine any potential security consequence of our choice as follows:

- Only a single PD will suffice to make the target data inaccessible. Thus approximating PH with multiple provided PDs or PNs is infeasible due to the high risk of deletion.
- The adversary may extract non-PH words (i.e., PNs and PDs) from a victim, before launching a guessing attack through the Gracewipe interface. Such seemingly non-secret information may help the adversary to identify boundaries between password spaces. In Gracewipe-XD, edit distance is omnidirectional, and also parametrized by character sets, maximum length etc. We thus argue that the attacker cannot easily identify a trend/pattern pointing to PH.

Implementation:

A significant change in the edit-distance-based scheme is that we must store PH in an NVRAM index for the DL-distance calculation. We seal PH with the Gracewipe environment measurements. At evaluation time, PH must be loaded to the system memory (with the correct Gracewipe environment), which may provide a chance to launch cold boot attacks; note that DMA attacks are prevented by TXT. However, in our implementation, PH stays in memory for a short period of time—PH is unlocked after the candidate password is entered, and erased immediately after the DL-distance calculation (on average, 3-4 milliseconds in our test environment, for 8-character passwords). In this case, we argue that timing the cold boot attack to extract PH would be infeasible. Alternatively, PH can be copied directly to CPU registers to bypass memory attacks.

A.9.4.D Other Unlocking Schemes

We have also explored more possibilities for the password schemes and deletion triggers. They can be further examined and implemented for specific use-cases.

Pattern-Based Deletion Passwords:

The user is allowed to define her own customized pattern for PDs, e.g., using regular expressions. Any string that does not match such pattern will be treated as PNs or invalid. This may provide better memorizability while allowing a large number of PDs (users must remember the pattern, but not the actual PDs). A foreseeable downside is that the adversary may learn the pattern (e.g., through text-mining) from passwords extracted from the victim, and then avoid passwords of such pattern when guessing. Also, this scheme does not address mistyping.

Misremember-Tolerant Deletion Passwords:

A user may accidentally enter a deletion password (e.g., due to stress, misremember) and realize the mistake instantly. In the basic Gracewipe, this would be fatal, as KH will be deleted immediately after receiving a PD. To reduce such accidental dental deletion, we adapt the counter-based scheme as follows.

For any entered PD, before triggering deletion, a counter value is checked; if it is already 1 (or any custom threshold), deletion is triggered as usual; otherwise, the counter value is incremented and the entered PD is just treated as PN. The counter value is initialized to 0 during deployment. A correct entry of PH will reset the counter. Thus, at the cost of allowing the adversary to try an additional password, accidental deletion can be avoided.

Small-Dictionary Scheme:

The use of a built-in dictionary may serve as an alternative for tolerating user typos. The assumption here is that a mistyped word is more likely to be absent in the dictionary (but not always, e.g., race and face). Multiple user-chosen words (e.g., 5) form a passphrase. We adapt the 5-Dictionary scheme to incorporate the following considerations: (i) We would like to follow the principle in the edit-distance-based scheme, i.e., the number of PDs is arbitrarily large to make sure that the probability of triggering deletion is rather high, meanwhile with PNs serving as a buffer zone to accommodate typos. (ii) To increase the number of PDs, we can treat the invalid passwords in 5-Dictionary as PDs. However, most such invalid passwords are formed by non-dictionary words, and therefore can be easily entered by mistyping. Thus, we would like to design an adapted scheme that triggers deletion with non-dictionary words but tolerates mistyping.

Instead of using large natural dictionaries (e.g., English vocabulary), the user defines a custom dictionary that contains her memorizable strings (words or non-words). The size of the custom dictionary is relatively small that fits in TPM NVRAM, e.g., 50-100 words; such a small dictionary ensures that at a very high probability a random word falls outside the dictionary and may eventually lead to deletion. However, the custom dictionary must be both confidentiality and integrity protected, unlike the public standard dictionary in 5-Dictionary.

A PH consists of three (or more) segments, each picked from the custom dictionary. If none of the three segments of the typed password belong to the dictionary, the password is considered as PD, and deletion is triggered. Otherwise, the typed password is treated as PN. We assume that the probability of mistyping all three segments is low, reducing the chance of inadvertent deletion trigger by mistyping or even misremembering (see below). In contrast, without the knowledge of the custom dictionary, the attacker's guessable password space is as large as 5-Dictionary.

This scheme also partially addresses accidental deletion due to misremembering. If the user chooses to include all potential words/strings she may use in her passphrases for other accounts, even if she misremembers, still one or more segments of the misused passphrase fall in the custom dictionary and thus will be only treated as a PN.

Another benefit of the small-dictionary scheme is that the invalid password space and the deletion password space can be better mixed (for plausibility). Also, the hidden password is more difficult to approximate from extracted passwords (i.e., not reflecting constant space "away" from other passwords), because the custom dictionary diffuses candidate invalid/deletion passwords from the hidden one. Also, the custom dictionary being small allows it to be stored securely in TPM NVRAM, which removes access to the sealed dictionary without the correct Gracewipe environment (as opposed to sealed data stored on disk).

A.9.4.E Generalized Workflow

Different password and deletion schemes provide flexibility, and can be used in different application scenarios. However, the core Gracewipe features are always provided: plausible user compliance, undetectable deletion trigger, risky guessing and verifiability. In this section, we provide a generalized workflow for Gracewipe variants.

At deployment time, in addition to setting up secrets (KH, KN), according to the actual variant of Gracewipe in use, the user defines corresponding parameters (thresholds, rules, or a custom dictionary). Each time the system is booted into Gracewipe in a TXT session (loaded by GRUB and tboot). The user is prompted for a password. The difference of Gracewipe variants is reflected in the evaluation of the entered password, which eventually produces an outcome (KN, KH, or deletion). Thereafter, the system is unlocked, or a quote is generated for later verification if deletion is triggered.

In normal operations, the user chooses to enter PN or PH, which unlocks KN for the decoy system or KH for the hidden system, respectively. If she mistypes or misremembers the password, the Gracewipe variant in use determines to what extent she can avoid triggering the deletion. When the user is coerced, she can be forced to provide a list of valid password, the number of which depends on the password scheme used.

A.9.5 Remote Data Purging with Verifiability

Verifiable media sanitization is key to device repurposing and scrapping in an enterprise environment. Current industry standards achieve such verifiability by enforcing institutional procedures preceded by proper data classification and staff training. The effectiveness of these approaches depends on the institutional aspect much more than the technical one. In particular, the verification phase is rather manual and thus the trust model should embrace all the personnel involved in this process. Some situations (e.g., to handle hostile employees in a mass layoff) may mandate quick and verifiable data deletion from many computers at once. Some tools provide user "verifiability" through a success response/confirmation at the software-level. Considering the target software stack being potentially compromised or mistakenly altered, such response is considered unreliable. Therefore, the true verifiability must be based on correct execution of the whole process with integrity.

We combine the stand-alone implementation of Gracewipe with Intel Active Management Technology (AMT) to achieve network-based deletion in multiple LAN-connected machines within a few seconds. Intel AMT provides out-of-band remote access to computers irrespective of their power state (on/off/sleep/hibernate), as long as the target computer is connected to the power line and network; other network channels can also be used (e.g., WAN, WiFi). The deletion process is initiated from an admin machine, which is authenticated by the target machines (e.g., TLS certificates, AMT passwords); the deletion process on the target machines can also be triggered from a third-party service, where the user has an account, and can initiate the deletion process after authenticated by the service. A modified Gracewipe is started in a target machine, and if the admin user provides a valid deletion password, Gracewipe will erase the hidden volume key from the secure storage (TPM), generate a quote (cryptographic proof of the running code), and forward the quote to the admin. Note that authentication of the admin machine is critical to prevent malicious data deletion by a remote adversary; similarly, authentication of the target machine is also necessary (e.g., via mutual TLS certificates), since an impersonated target machine can learn the correct AMT/deletion passwords from the admin machine.

A.10 Distinguishing and Superior Aspects

Solutions related to secure deletion have been explored both by the research community and the industry. However, we are unaware of solutions that target verifiability of the deletion procedure, and unobservability and indistinguishability of the triggering mechanism-features that are particularly important in the threat model we assumed. Here we summarize proposals related to secure deletion and coercive environment.

A.10.A Limited-Try Approach.

Existing approaches, including deniable encryption (such as TrueCrypt hidden volumes), verifiable destruction (Vanish), have technical and legal problems of data protection under coercion. One potential solution is based on leveraging a hardware security module (HSM) with a limited-try scheme. The HSM will delete the encryption key if wrong keys are entered a limited number of times. However, such a system cannot be software-only as the destruction feature can be easily bypassed. Essentially, Gracewipe combines TPM and TXT to achieve HSM-like guarantees, i.e., isolated and secure execution with secure storage (albeit limited tamper-resistance), without requiring HSMs.

A.10.B Authentication Under Duress.

Panic passwords for authentication under duress have limitations. Although schemes involving two passwords (regular/panic) also introduce a comprehensive threat model that considers the attacker's persistence (iterated and randomized sequence of attempts), and propose new panic password schemes, Gracewipe have been implemented to use only one deletion password. However, they can be amended to provide support for multiple deletion passwords although potentially current TPM NVRAM access restrictions may affect such extensions (see under "TPM deadlock" in Section A.7). Whilst noting that the use of a panic password, either by the victim or the adversary, must be undetectable the proposed solutions in the prior art are as the panic password is actually discarded by the server-end. However, in Gracewipe, after the key deletion has been performed, we enable the victim to prove to a reasonable adversary that Gracewipe has been executed with deletion, and further questioning the victim is of no use.

Beyond panic passwords, other approaches consider biometric considerations such as skin conductance to derive authentication secrets such as passwords or keys since some biometrics can change significantly between normal and stressed situations, implying that when under duress a victim cannot reveal the actual key, even if she wants to cooperate. However, others consider that inherent natural user variations and/or the use of relaxation drugs etc. will not provide sufficient resolution. Alternatively, another approach is the use of implicitly learned passwords, which cannot be revealed by a user (due to no explicit knowledge); the passwords are implicitly learned by a user through the use of a specially crafted game. Both enrolment and authentication phases require significantly more time than regular authentication mechanisms.

A.10.C

Within a comprehensive survey of existing solutions for secure deletion of user data on physical media, including flash, and magnetic disks/tapes, categorizing and comparing based on how they are interfaced with the physical media (e.g., via user-level applications, file system. physical/controller layers), and the features they offer (e.g., deletion latency, target adversary and device wear), Gracewipe's SED-based solutions are of significance to secure deletion. The adversary in Gracewipe can be classified as bounded coercive as he can detain the victim, and keep the device for as long as he needs with all hardware tools available, but cannot decrypt the Gracewipe-protected data without the proper key.

A.10.D.

Techniques have been proposed for mutual authentication between humans and computers, arguing that forged bootloader can trick the user to leak her password. However, even with TPM sealing, attacks aiming to just obtain the user secret can still occur, as demonstrated by the tamper-and-revert attack to BitLocker. Allowing the user to set up a sealed user-chosen message, which should be unsealed by the machine before it authenticates the user, the user can then verify if it is her message. Nevertheless, if the attacker stealthily turns on the machine and notes down the unsealed secret, he can still forge the bootloader. As a counter-measure, after each successful login, the old message can be replaced with a new user-chosen one to prevent such replay attacks (hence the message is termed as monce, as a message counterpart of nonce). In addition, the monce is stored on a separate USB disk that serves as a physical key to bootstrap the process credibly. Gracewipe may be extended with such techniques to defeat evil-maid attacks.

A.10.E DriveCrypt Plus Pack (DCPP).

DCPP is a closed-source FDE counterpart of TrueCrypt, with several interesting features, such as deniable storage (hidden volumes), the use of USB tokens for multi-factor authentication, UEFI support, destruction passwords and security by obfuscation. A user can define one or two destruction passwords (when two are defined, both must be used together), which, if entered, can immediately cause erasure of some regions of the hard drive, including where the encryption keys are stored. What DCPP is obviously still missing is a trusted environment for deletion trigger, and measurement for the deletion environment. The adversary may also alter DCPP (e.g., through binary analysis) to prevent the deletion from happening. More seriously, the adversary can clone the disk before allowing any password input.

A.11 Remarks on Implementation as Gracewipe

Within the preceding sections A.1 through A.8 we present and consider a special case of data security, namely making data permanently inaccessible when under coercion. With Gracewipe we enable such deletion with additional guarantees:

verification of the deletion process;
indistinguishability of the deletion trigger from the actual key unlocking process; and
no password guessing without risking key deletion.

If key deletion occurs through a user supplied deletion password, the user may face serious consequences (legal or otherwise). Therefore, such a deletion mechanism should be used only for very high-value data, which must not be exposed at any cost, and where even accidental deletion is an acceptable risk (i.e., the data may be backed up at locations beyond the adversary's reach). We designed and implemented Gracewipe for compatibility with and overlay to two widely-available real world FDE schemes, TrueCrypt with hidden volume support and SED, allowing deployment in a range of commercial and consumer computer systems. Two embodiments of the prototype both boot Windows, which posed some additional challenges. The implemented methodologies introduce no additional hardware/architectural requirements on the computer systems. We use TPM for secure storage and enforcing loading of an untampered Gracewipe environment, and for a secure and isolated execution, we rely on Intel TXT. Already significant quantities of consumer-grade machines are equipped with both a TPM chip (or similar chips, e.g., Secure Element), and TXT/SVM/SGX/TrustZone capable CPU. Thus, Gracewipe can immediately benefit its targeted user base on existing deployed computer system infrastructure.

Within the embodiments of the invention described above the computer system memory is partitioned into a hidden system and a decoy system. However, within other embodiments of the invention rather than the deletion password, PD, only deleting the hidden system encryption key KH it would be evident that it can alternatively delete both the hidden system key KH and the decoy system key KD such that the attacker is left with a pair of inaccessible memory systems. Optionally, the two or more decoy systems may be employed wherein one or more of the decoy systems encryption keys are deleted with the true hidden system key.

B: Secure Deletion System During Sleep-Wake—Hypnoguard

B.1. Introduction

Within the preceding Section A, the issue of an attacker coercing a victim into providing their security credentials to access the computer system was discussed and an innovative solution, Gracewipe, described that performs a secure deletion upon entering a deletion key which to the attacker will appear to be a valid key. Gracewipe addressed a pre-OS solution such that the computer system is being booted from a powered down state. However, many computer systems enter a sleep mode under a variety of conditions including those established by manufacturers and personal preferences. For example, laptop computers are placed into sleep (suspend-to-RAM/S3), when not in active use (e.g., as in a lid-close event). Accordingly, a major concern for unattended computers in sleep is the presence of user secrets in system memory, including disk encryption keys as in Gracewipe. An attacker with physical access to a computer in sleep (e.g., when lost/stolen, or obtained by coercion) can launch side-channel memory attacks, e.g., DMA attacks by exploiting one or more vulnerable device driver where common mitigations include fixes, input/output memory management unit (IOMMU) and disabling DMA when a display screen is locked. A sophisticated attacker can also resort to cold-boot attacks by exploiting DRAM memory remanence effect where proposed mitigations are summarized later in this section. Several other simpler techniques also exist for memory extraction where some tools are specifically designed to bypass OS lock screen and extract in-memory disk encryption keys, e.g., Elcomsoft™ Forensic Disc Decryptor (EFDD).

Other proposed solutions address memory-extraction attacks by making the attacks difficult to launch, or by reducing applicability of known attacks. Example solutions include: tamper-protected DRAM (requiring new RAM design); storing secrets to alternative locations not directly reachable via DMA/cold-boot attacks, e.g., secrets in CPU registers or GPU registers. More recently a proposed approach exploiting hardware transactional memory (Intel TSX) seeks to address these issues by keeping private keys outside of RAM. Limitations of these solutions include being too application-specific (e.g., disk encryption) and not being scalable (i.e., can support only a few application-specific secrets). We believe that protecting only cryptographic keys is fundamentally inadequate, as there exists more privacy/security sensitive content in RAM than just keys and passwords.

Full-memory encryption can be used to keep all RAM content encrypted, as used in proposals for encrypted execution: instructions/data remain encrypted in RAM, and decrypted just before execution within the CPU. However, these typically require architectural changes in hardware. Most solutions also do not consider sleep/S3, where re-claiming ownership (re-authentication) is needed after the computer wakes up. For instance, within COPKER ("Computing with Private Keys without RAM" in Network and Distributed System Security Symposium, 2014), the secrets are well protected against cold-boot attacks, even during sleep/wakeup cycles. However, when the computer wakes up, with physical access, anyone can continue using the secrets without mounting any memory attacks. If a regular re-authentication is mandated (e.g., OS login/unlock), a user-chosen password may not provide enough entropy to withstand guessing attacks (offline and/or online).

Accordingly, the inventors have established an inventive system/methodology, which we refer to as "Hypnoguard" to protect all memory-resident OS/user secrets across S3 suspensions, against memory extraction attacks, and guessing/coercion of user passwords used in re-authentication during wakeup. In order to support widespread adoption design solution exploits off-the-shelf CPU/memory and does not change applications. Rather, memory extraction is mitigated by performing an in-place full memory encryption before entering sleep, and then restoring the plaintext content/secrets at wakeup-time. The memory encryption key is encrypted by a Hypnoguard public key, the private part of which is sealed in a Trusted Platform Module (TPM) chip with the measurement of the execution environment supported by CPU's trusted execution mode (e.g., Intel TXT), The memory encryption key is thus bound to the execution environment, and can be released only by a proper re-authentication process. Guessing through Hypnoguard may cause the memory content to be permanently inaccessible (due to the deletion of the TPM-stored Hypnoguard private key), while guessing without Hypnoguard (e.g. an attacker-chosen custom wakeup procedure) is equivalent to brute-forcing a high-entropy key (due to TPM sealing). A user-defined policy (e.g., after three failed attempts, or via a special deletion password as in Gracewipe) determines when the deletion of Hypnoguard private key is initiated. As a result, either the Hypnoguard private key cannot be unsealed (leading to inability to decrypt the memory content) due to an incorrect measurement (altered/malicious program), or the adversary takes a high risk to guess through the unmodified environment.

By encrypting the entire the memory space, except a few system-reserved regions, where no OS/user data resides, we avoid per-application changes. Our method leverages a modern CPU's Advanced Encryption Standard New Instructions (AES-NI) extension to quickly encrypt/decrypt commonly available memory sizes (up to 8 GB in less than one second), thereby avoiding degraded user experience during sleep/wake cycles. To support systems with larger memory sizes (e.g. 32/64 GB), we also provide a variant, where applications can selectively request specific memory pages via mmap( ) to be protected by Hypnoguard.

Due to the peculiarity of the wakeup-time environment, we face several challenges in implementing Hypnoguard. Firstly, we have to manually deal with OS-less multicore AES encryption/decryption (including within TXT), and 32-bit/64-bit switching for covering memory space greater than 4 GB. Also, unlike boot-time (when peripherals are initialized by BIOS) or run-time (when device drivers in the OS are active), at wakeup-time, the system is left in an undetermined state, e.g., empty PCI configuration space and uninitialized I/O controllers. We implement custom drivers to restore the keyboard and VGA display to facilitate easy user input/output, which is inadequately addressed in other proposals, due to the atypical nature of the wakeup state.

It should be noted that, similar to Hypnoguard, several boot-time solutions also perform system integrity check cryptographically, and authenticate the user (and may release secrets, e.g., FDE keys, in some cases); however, they do not consider potential physical memory attacks thereafter, including during sleep/wake cycles. Examples of such approaches include: tboot, XMHF, BitLocker, UEFI Secure Boot and the inventors own Gracewipe. On the other hand, run-time secure execution solutions in the prior art generally do not consider physical ownership changes. Solutions that consider ownership change within the prior art, generally exclude memory attacks. For lost/stolen computers, some remote tracking services may be used to trigger remote deletion, assuming the computer can be reached online (with doubtful effectiveness). To the best of the inventor's knowledge, Hypnoguard is the first tool addressing wakeup time threats with physical access, without relying on a remote, third-party service.

B.1.A. Contributions:

B.1.A.1.

We design and implement Hypnoguard, a new approach that protects confidentiality of all memory regions containing OS/user data across sleep/wake cycles. We provide defense against memory attacks when the computer is in the wrong hands, and severely restrict guessing of weak authentication secrets. Several proposals and tools exist to safeguard data-at-rest (e.g., disk storage), data-in-transit (e.g., network traffic), and data-in-use (e.g., live RAM content); with Hypnoguard, we fill the gap of securing data-in-sleep.

B.1.A.2. Our primary prototype implementation uses full-memory encryption to avoid per-application changes, i.e., all applications can benefit immediately from Hypnoguard. Leveraging modern CPU's AES-NI extension and multi-core processing, we achieve around 8.7 GB/s encryption/decryption speed for AES in the CTR mode in an Intel i7-4771 processor (3.50 GHZ, 4 physical cores). This performance ensures less than a second additional delay in the sleep/wake process for 8 GB RAM (an apparently acceptable overhead). For larger memory systems (e.g., 32 GB, a rarity in consumer-grade computers), where whole memory encryption may add noticeable delay, we provide POSIX-compliant system calls mmap( )/unmap( ), for protecting application-selected memory pages (requiring minor changes in applications). No kernel patches are necessary.

B.1.A.3. We enable wakeup-time secure processing that can be leveraged for other use-cases, e.g., OS/kernel integrity check. Wakeup-time secure processing has not been directly explored previously.

B.2. Terminologies, Threat Model and Goals

We explain the terminologies used for Hypnoguard, and our goals, threat model and operational assumptions. We use CPU's trusted execution mode (e.g., Intel TXT), and the trusted platform module (TPM) chip.

B.2.1 Terminologies

Hypnoguard key pair (HGPUB, HGPRIV): A pair of public and private keys generated for each deployment/setup of Hypnoguard. The private key (HGPRIV) is sealed in TPM NVRAM with the measurement of the environment; it is retrieved through the Hypnoguard user password (evaluated in the genuine environment), and can be permanently deleted in accordance with a user-set policy to restrict password guessing. The public key (HGPUB) remains in RAM.

Symmetric Key for Memory Encryption (SK):

A high entropy (e.g., 128 bits long) symmetric key, randomly generated each time before entering sleep, is used for whole memory encryption. Before the system enters sleep, SK is encrypted using HGPUB and the cipher text is stored in the small non-encrypted region of memory (see Section B.4.3).

Hypnoguard User Password:

A user-chosen password to unlock the sealed key HGPRIV (and thus the protected SK) at wakeup-time. It needs to withstand only a few guesses, depending on the actual unlocking policy. This password is used only by Hypnoguard, and it is unrelated to the OS unlock password (which we do not mandate).

B.2.2 Goals

We primarily consider attacks targeting extraction of secrets through physical access to a computer in S3 sleep (i.e., suspend-to-RAM). Such attacks may be launched when a computer is left unattended, stolen, or when the owner is under coercion. We want to protect memory-resident secrets against side-channel attacks (e.g., DMA/cold-boot attacks), and ensure that after wakeup, a password guessing attack cannot be launched to access the protected secrets, in RAM, or elsewhere.

More specifically, our goals with Hypnoguard include the following: (G1) The user/OS secrets, SK, or HGPRIV must not remain in plaintext anywhere in RAM before resuming the OS to make memory attacks inapplicable. (G2) The protected user secrets (in our implementation, the whole RAM) must not be retrieved by brute-forcing the SK or HGPRIV, even if Hypnoguard is not active (e.g., offline attacks). (G3) No guessing attacks should be possible against the Hypnoguard user password, unless a genuine copy of Hypnoguard is loaded as the only program in execution. (G4) The legitimate user should be able to authenticate with trivial effort (i.e., memorization of strong passwords is not required). (G5) Guessing the user password when Hypnoguard is active (online) should be restricted by the penalty of having the secrets deleted, so that the adversary would always have to take a high risk to mount dictionary attacks through Hypnoguard.

An additional goal for coercion attacks during wakeup (similar to boot-time protections of Gracewipe): (AG1) once deletion is successful, there should be a cryptographic evidence that convinces the adversary that the RAM secrets are permanently inaccessible.

B.2.3 Threat Model

We list below the threat model and operational assumptions for Hypnoguard.

1. The adversary may be either an ordinary person with skills to mount memory/guessing attacks, or an organization in possession of legal/illegal coercive powers, and abundant (but not unbounded) computational resources. For example, the adversary may successfully launch sophisticated cold-boot attacks, but cannot brute-force a random 128-bit AES key.

2. Before the adversary gains physical control, the computer system (hardware and OS) has not been compromised, otherwise Hypnoguard's protections are ineffective. We thus exclude the so-called evil-maid attacks (generally target boot-time protections). Also, binary code insertion into encrypted RAM will likely cause a system crash as the decrypted code will generate invalid instructions with a very high probability; we thus avoid integrity-protecting the encrypted RAM content.

3. The host OS is assumed to be a general-purpose OS, e.g., Windows or Linux (which may or may not provide a TXT-aware kernel). Also, the Hypnoguard tool may reside in an untrusted file system and be bootstrapped from a regular OS.

4. We assume all user data, the OS, and any swap space used by the OS are stored encrypted on disk, e.g., using a properly configured software/hardware full-disk encryption system. A secure boot-time solution should be used to enforce strong authentication (e.g., Gracewipe). The FDE key may remain in RAM (under Hypnoguard's protection). This assumption can be relaxed, only if the data on disk is assumed non-sensitive.

5. Any information placed in memory by the user/OS is treated as sensitive. With full memory encryption, it is not necessary to distinguish user secrets from non-sensitive data (e.g., system binaries).

6. The adversary must not be able to capture the computer while it is operating/working (ACPI S0). We assume the computer goes into sleep after a period of inactivity, or through user actions (e.g., lid-close of a laptop).

7. The adversary may attempt to defeat Hypnoguard's policy enforcement mechanism (i.e., when to delete or un-lock HGPRIV during authentication). With physical access, he may intervene the wakeup process (e.g., by tampering with the UEFI boot script for S3), and may attempt to observe the input and output of our tool and influence its logic. In all cases, he will fail to unseal HGPRIV, unless a flaw in TXT/TPM is found.

8. In the case of coercion, the user never types the correct password but uses Hypnoguard provided strategies (e.g., deletion passwords). Coercion has been considered recently during boot-time, requiring the computer to be in a powered-off state before the user gets into a coercive situation (Gracewipe as discussed in Section A). We consider coercion also during wakeup-time, assuming the computer is in sleep rather than powered-off. For comprehensive protection, both such systems should be used in conjunction.

9. The correct measurement of the loaded program (platform state) provided by TPM and the trusted execution environment enabled by CPU (e.g., Intel TXT) are trustworthy. Of course, we require a system with a TPM chip and a TXT-capable CPU. For full memory encryption, we also assume the CPU is AES-NI capable (otherwise, memory encryption will be time consuming, and users must resort to partial memory encryption). Many consumer-grade Intel and AMD CPUs offer TXT/SVM and AES-NI (as well as, ARM CPUs in mobile devices).

B.3. Design

In this section, we detail the architecture of Hypnoguard and demonstrate how it achieves the design goals stated in Section B.2. Technical considerations not specific to our current implementation are also discussed.

B.3.1. Overview

Figure 2:
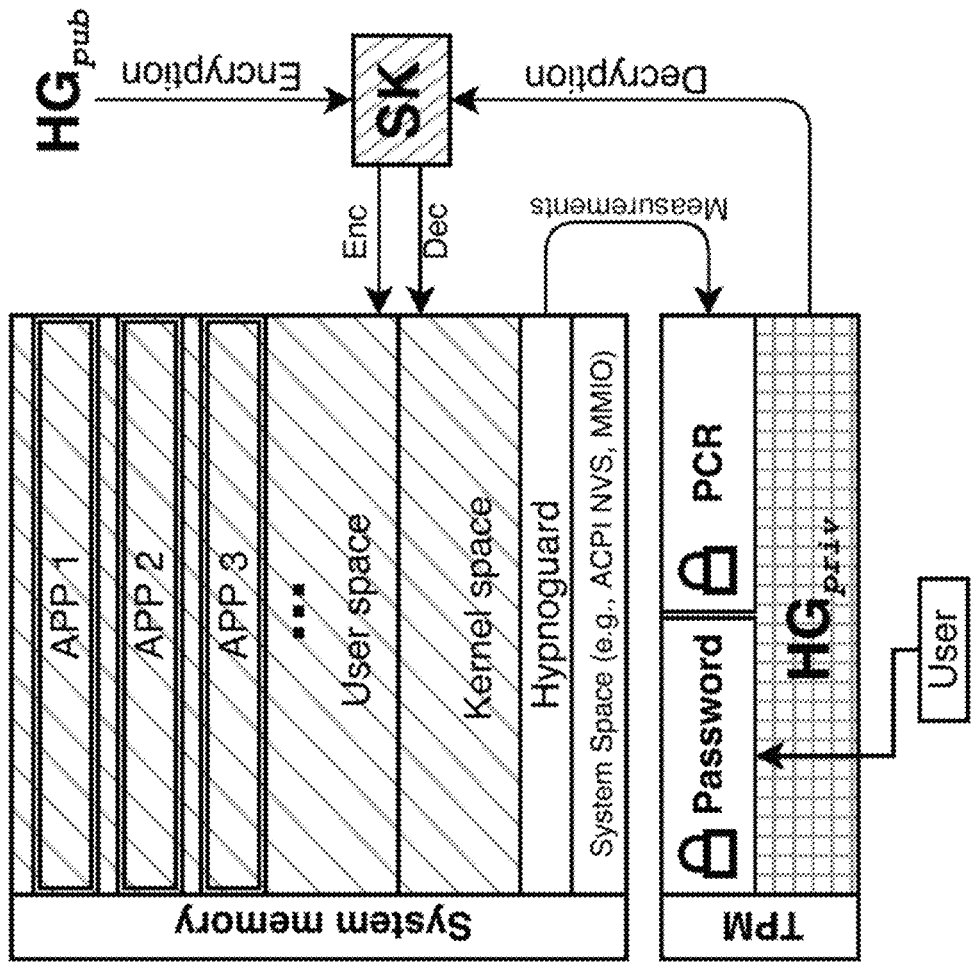
FIG. 2 depicts an example of computer memory layout and cryptography key usage within Hypnoguard according to an embodiment of the invention.

FIG. 2 depicts the memory layout and key usage of Hypnoguard across sleep/wake states; the transition and execution flows are described in Section B.4.1. User secrets are made unavailable from RAM by encrypting the (almost) whole system memory (regardless of kernel or user spaces) with a random symmetric key SK before entering sleep. Then SK is encrypted using HGPUB and stored in system memory. At this point, only HGPRIV can decrypt SK.

HGPRIV is sealed in the TPM chip with the measurements of the genuine copy of Hypnoguard protected by a regular user password.

At wakeup-time, Hypnoguard takes control in a TXT session and prompts the user for the Hypnoguard user password. Only when the correct password is provided in the correct Hypnoguard environment, is HGPRIV unlocked from TPM (at this time still in TXT). Then, HGPRIV is used to decrypt SK and erased from memory right after that. The whole memory is then decrypted with SK and the system exits from TXT back to normal OS operations.

B.3.2 Design Choices and Elements

Hypnoguard in Intel TXT.

We execute the unlocking program in the secure mode of CPU, e.g., Intel Trusted Execution Technology (TXT). We rely on its unforgeable measurement of the execution environment, which is stored in TPM and used to seal HGPRIV. Meanwhile, the memory and I/O space of the measured environment is protected from any external access attempt (via Intel VT—d/IOMMU). The use of TXT and TPM ensures that only the loaded program that is actually executing can generate the corresponding measurement; i.e., neither that the measurement can be forged at the load time nor can the measured program be altered after being loaded (e.g., via DMA attacks).

At wakeup-time, the unlocking program prompts the user for the password and accesses the policy (in TPM) to check if deletion of HGPRIV needs to be triggered. The correct password will release HGPRIV, and if the failed attempt meets certain criteria in the policy (e. g., threshold crossed or a deletion password is entered), HGPRIV will be deleted immediately, Also, the choice of keeping Hypnoguard a standalone program separate from the OS has at least two advantages:

(a) Small trusted computing base (TCB): If Hypnoguard's unlocking program is integrated with the OS, then we must also include OS components (at least the kernel and core OS services) in the TPM measurement; this will increase the TCB size significantly. Also, in a consumer OS, maintaining the correct measurements of such a TCB across frequent updates and run-time changes, will be very challenging. Unless measuring the entire OS is the purpose, a TXT-protected application is usually a small piece of code, not integrated with the OS, to achieve a stable and manageable TCB. In our case, only the core Hypnoguard unlock logic must be integrity-guaranteed (i.e. bound to TPM measurement). The small size may also aid manual/automatic verification of the source code of an implementation. (b) Portability: We make Hypnoguard less coupled with the hosting OS except for just a kernel driver, as we may need to work with different distributions/versions of an OS, or completely different OSes.

TPM's Role in Hypnoguard.

TPM serves three purposes:

1. By working in conjunction with Intel TXT, TPM's platform configuration registers (PCRs) maintain the unforgeable measurement of the execution environment.

2. We make use of TPM NVRAM to store HGPRIV safely. There are two layers of protection that are critical to Hypnoguard's functionality. First, HGPRIV, is sealed to the Hypnoguard environment (specifically, under the Intel SINIT module and the Hypnoguard unlocking program). Sealing is an operation where the data is encrypted by (a key derived from) the TPM chip's storage root key (SRK) and the measurement of the loaded program in PCRs. Any binary other than the genuine copy of Hypnoguard will fail to unseal HGPRIV. Second, an auth-data secret, derived from the Hypnoguard user password, is also used to protect HGPRIV. Failure to meet either of the above two conditions will lead to denial of access.

3. If HGPRIV is deleted by Hypnoguard (e.g., triggered via multiple authentication failures, or the entry of a deletion password), we also use TPM to provide a quote, which is a digest of the platform measurement signed by the TPM's attestation identity key (AIK) seeded with an arbitrary value (e.g., time stamp). Anyone, including the adversary, can verify the quote using TPM's public key at a later time, and thus confirm that deletion has happened.

4. For generation of the long-term key pair HGPUB and HGPRIV, and the per-session symmetric key SK, we need a reliable source of randomness. We use the TPM command TPM_GetRandom to get the required number of bytes from the random number generator in TPM.

Unlocking Policy. A user-defined unlocking policy will determine how Hypnoguard reacts to a given password, i.e., what happens when the correct password is entered versus when a deletion or invalid password is entered. If the policy allows many/unlimited online (i.e., via Hypnoguard) guessing attempts, a dictionary attack might be mounted, violating goal G5; the risk to the attacker in this case is that he might un-knowingly enter the deletion password. If the composition of the allowed password is not properly chosen (e.g., different character sets for the correct password and the deletion password), an adversary may be able to recognize the types of passwords, and thus avoid triggering deletion.

In general, there can be static policies configured with user-selected passwords and/or rule-based schemes that support evaluating an entered password at run-time. Security and usability trade-offs should be considered, e.g., a quick deletion trigger versus tolerating user mistyping or misremembering. During setup, both unlocking and deletion passwords are chosen by the user, and they are set as the access passwords for corresponding TPM NVRAM indices: the deletion password protects an index with a deletion indicator and some random data (as dummy key), and the unlocking password protects an index containing a null indicator and HGPRIV. Note that, both the content and deletion indicator of an NVRAM index are protected by sealing (i.e., attackers cannot exploit the indicator values). Multiple deletion passwords can also be defined. We also use a protected monotonic counter (sealed by the Hypnoguard unlocking program and initialized to 0) to enforce only a limited number of incorrect attempts, after which, deletion is triggered; this is important to deal with lost/stolen cases.

At run-time, only when the genuine Hypnoguard program is active, a typed password is used to attempt to unlock the defined indices, sequentially, until an index is successfully opened, or all the indices are tried. In this way, the evaluation of a password is performed only within the TPM chip and no information about any defined plaintext passwords or HGPRIV is leaked in RAM (leaving no chance to cold-boot attacks). If a typed password unlocks none of the indices, it is considered a failed attempt and a monotonic counter will be incremented by 1. When the counter reaches a preset threshold, deletion is triggered. The counter is reset to 0 when the correct password is entered (i.e., HGPRIV is successfully unlocked). Thus, a small threshold (e.g., 10) may provide a good balance between security (quick deletion trigger) and usability (the number of incorrect entries that are tolerated). For high-value data, the threshold may be set to 1, which will trigger deletion immediately after a single incorrect entry.

Deployment/Setup Phase.

Hypnoguard requires a boot-strapping step for its initialization. Due to the way the measurement is performed (the same environment both at the time of sealing and unsealing), the Hypnoguard program must support two modes: one for setup and the other for normal operations. First, with a custom script, the 2048-bit RSA key pair is generated in the user OS with HGPUB saved in a file and HGPRIV written to a location in the Hypnoguard reserved region. Then the system is forced to enter S3 mode. At wakeup-time, Hypnoguard enters its setup mode where the user is asked to create her passwords (for both unlocking and deletion). With the unlocking password, HGPRIV, is sealed in an NVRAM index, and also indices with deletion indicators are allocated and protected with the deletion password(s). There is also certain OS-end preparation for Hypnoguard, e.g., loading and initializing the Hypnoguard device drivers and other modules; see Section B.4.1.

Necessity of HGPUB and HGPRIV. Although we use random per sleep/wakeup cycle symmetric key (SK) for full-memory encryption, we cannot directly seal SK in TPM (under the Hypnoguard password), i.e., avoid using (HGPUB, HGPRIV). The reason is that we perform the platform-bound user re-authentication only once at the wakeup time, and without involving the user (in TXT) before entering sleep, we cannot password-seal SK in TPM. If the user is required to enter the Hypnoguard password every time before entering sleep, the user experience will be severely affected. In our current design, we keep SK encrypted under HGPUB in RAM, and involve the password only at wakeup-time to release HGPRIV; this password entry follows the normal OS unlock process.

B.3.3 how Goals are Achieved

G1 is fulfilled by Hypnoguard's full-memory encryption, i.e., replacement of all plaintext memory content (security sensitive or otherwise) with corresponding cipher text generated by SK. As the OS or applications are not involved, in-place memory encryption can be performed reliably. Such full-memory content replacement requires no awareness from either the OS or the applications (regarding how and where the user secrets are stored). SK resides in memory encrypted under HGPUB) (right after it finishes encrypting the whole memory). HGPUB can only be unlocked with the correct environment and password at wakeup-time and is erased from RAM right after its use in TXT.

A random SK with adequate length generated each time before entering sleep, and a strong public key pair (HGPUB, HGPRIV) generated during setup guarantee G2.

TPM sealing (even with a weak Hypnoguard user password) help achieve G3. Without loading the correct binary, the adversary cannot forge the TPM measurement and trick TPM to unseal the NVRAM index; note that, learning the expected PCR values of Hypnoguard does not help the attacker in any way. The adversary is also unable to brute-force the potentially weak user password, as the TPM chip ensures the consistent failure message for both incorrect passwords and incorrect measurements.

The user is required to memorize a regular password for authentication. If the adversary keeps the genuine environment but does not know the correct user password, he may be only left with a high risk of deleting HGPRIV. The legitimate user, however, knows the password and can control the risk of accidental deletion, e.g., via setting an appropriate deletion threshold. Therefore, G4 is satisfied.

When the adversary guesses through Hypnoguard, the password scheme (unlocking policy) makes sure that no (or only a few, for better usability) guessing attempts are allowed before deletion is triggered. This achieves G5.

The additional goal for coercion attacks is achieved through the TPM Quote operation. The quote value relies on mainly two factors: the signing key, and the measurement to be signed. TPM's unique key (Endorsement Key, aka. EK) is generated by the manufacturer and never leaves the chip in any operations. Its alias, AIK (Attestation Identity Key, derived from EK), serves as the signing key. This ensures the validity of the signature. The data to be signed is the requested PCR values. In TXT, the initial PCR value is set to 0, and all subsequent extend operations will update the PCR values in an unforgeable manner (measurements are extended via SHA1). As a result, as long as the quote matches the expected one, the genuine copy of the program must have been executed, and thus AG1 is achieved.

B.4. Implementation

In this section, we discuss our implementation of Hypnoguard under Linux; this implementation can be ported to other major OSes. We also performed an experimental evaluation of Hypnoguard's user experience (for 8 GB RAM) where no noticeable latency was observed during the wakeup-time (e.g., when the user sees the lit-up screen). We assume that a delay under a second before entering sleep and during wakeup is acceptable. For larger memory sizes (e.g., 16/32 GB), we also implement a variant that can encrypt customized memory regions to keep the latency acceptable.

B.4.1 Overview and Machine Configuration

The Hypnoguard tool is divided into three main parts:

HypnoCore (the main unlocking logic and the encryption/decryption engine);

HypnoDrivers (device drivers used by Hypnoguard, at wakeup-time outside the OS); and HypnoOSService (kernel service to prepare for S3 and HypnoCore).

HypnoCore and HypnoDrivers operate outside of the OS, and HypnoOSService runs with the OS. We primarily discuss the first two parts here, which are challenging to implement due to the lack of BIOS and OS support.

Execution Steps.

Figure 3:
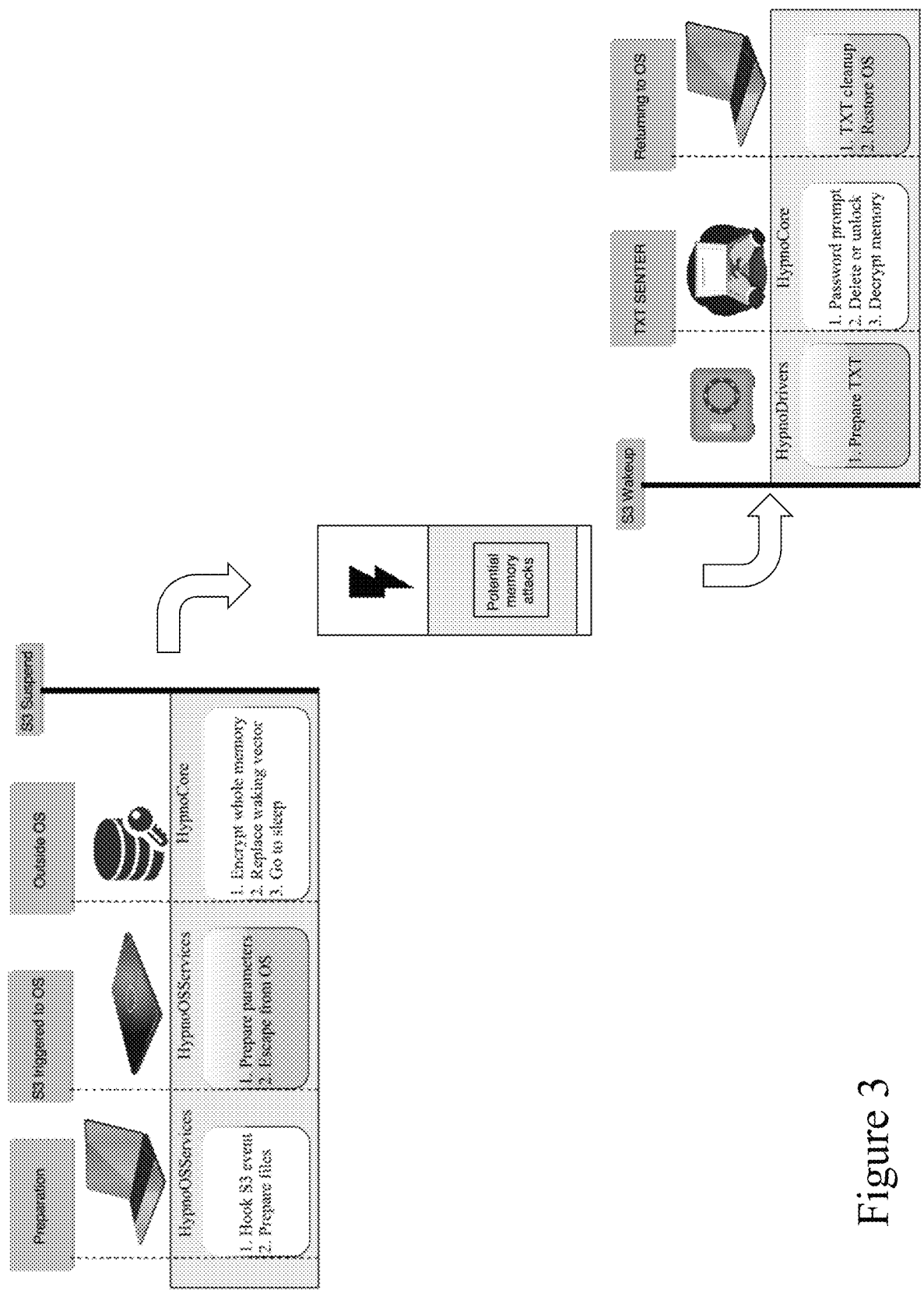
FIG. 3 depicts schematically a simplified flow/execution steps of Hypnoguard.

FIG. 3 depicts the generalized execution steps needed to achieve the designed functionalities on an X86 platform.

Step A: The preparation is done by HypnoOSService at any time while the OS is running before S3 is triggered. HypnoCore, HypnoDrivers, ACM module for TXT and the TXT policy file are copied into fixed memory locations known by Hypnoguard (see Section B.4.3). Also, HypnoOSService registers itself to the OS kernel so that if the user or a system service initiates S3, it can be invoked.

Step B: Upon entry, necessary parameters for S3/TXT are prepared and stored (those that must be passed from the active OS to Hypnoguard) and the kernel's memory tables are replaced with ours mapped for HypnoCore and HypnoDrivers.

Step C: Thereafter, HypnoCore encrypts the whole memory in a very quick manner through multi-core processing with AES CTR mode (using SK). SK is then encrypted by HGPUB (an RSA-2048 key). Before triggering the actual S3 action by sending commands to ACPI, Hypnoguard must replace the original OS waking vector to obtain control back once the machine is woken up.

Step D: At S3 wakeup, the 16-bit real mode entry, residing below 1 MB, of Hypnoguard waking vector is triggered. It calls HypnoDrivers to re-initialize the keyboard and display, and prepares TXT memory structures (TXT heap) and page tables.

Step E: Then, the core logic is executed in a TXT session. The user is prompted for a password, which is used to unlock TPM NVRAM indices one by one. Based on the outcome and the actual unlocking policy, either deletion of HGPRIV, happens right away and a quote is generated for further verification, or if the password is correct, HGPRIV is unlocked into memory. After decrypting SK, HGPRIV, is erased promptly. HypnoCore then uses SK to decrypt the whole memory.

Step F: TXT is torn down, and the OS is resumed by calling the original waking vector.

Machine Configuration.

We use an Intel platform running Ubuntu 15.04 (kernel version: 3.19.0). The development machine's configuration includes: an Intel Core i7-4771 processor (3.50 GHZ, 4 physical cores), Q87M-E chipset, 8 GB RAM (Kingston DDR3 4GB×2, clock speed 1600 MHZ), and 500 GB Seagate self-encrypting drive. In theory, our tool should work on most machines with TPM, AES-NI and Intel TXT (or AMD SVM) support, with minor changes, such as downloading the corresponding SINIT module.

B.4.2 Instrumenting the S3 Handler

Hypnoguard needs to gain control at wakeup-time before the OS resume process begins. For simplicity, we follow the method as used in a similar scenario in Intel tboot. An x86 system uses Advanced Configuration and Power Interface (ACPI) tables to communicate with the system software (usually the OS) about power management parameters. The firmware waking vector, contained in the Firmware ACPI Control Structure (FACS), stores the address of the first instruction to be executed after wakeup; and to actually put the machine to sleep, certain platform-specific data, found in the Fixed ACPI Description Table (FADT), must also be written to corresponding ACPI registers.

We must register Hypnoguard with an OS callback for replacing the waking vector, so as not to interfere with normal OS operations. In Linux, the_acpi_os_prepare_sleep( ) call-back can be used, which will be invoked in the kernel space before entering sleep. However, we cannot just replace the waking vector in this callback and return to the OS, as Linux overwrites the waking vector with its own at the end of S3 preparation (apparently to ensure a smooth resume). Fortunately, the required data to be written to ACPI registers is passed in as arguments, and as the OS is ready to enter sleep, we put the machine to sleep without returning to the OS.

B.4.3 Memory Considerations

To survive across various contexts (Linux, non-OS native, initial S3 wakeup and TXT), and not to be concerned with paging and virtual memory addressing, we reserve a region from the system memory by providing a custom version of the e820 map, so that Linux will not touch it afterwards. This is done by appending a kernel command line parameter memmap. 1 MB space at 0x900000 is allocated for HypnoCore, HypnoDrivers and miscellaneous parameters/data to be passed between different transition states, e.g. the SINIT module, original waking vector of Linux, policy data, stack space for each processor core, and Intel AES-NI library.

Full-Memory Coverage in 64-Bit Mode.

A major challenge encountered to achieve full-memory encryption is the transition between 32-bit to 64-bit mode, as needed to support more than 4 GB memory sizes. However, we cannot simply compile the Hypnoguard binary into 64-bit mode as most other modules (especially those for TXT and TPM access) are only available in 32-bit mode, and adapting them will be non-trivial (if possible), because of the significantly different nature of 64-bit mode (e.g., paging is mandatory).

We choose to keep HypnoCore and HypnoDrivers unchanged, and write a trampoline routine for the 64-bit AES-NI library (see Section B.5). Function calls to the library (in our case intelAES_encdec128_CTR( )) are encapsulated to the assembly entry lramp0line_64, where we change various registers to enable the long mode (i.e., 64-bit mode). Distinct from other modes, paging is mandatory in the long mode, and in addition to the regular 3-tier page tables (page-directory pointer table (PDPT), page-directory table (PDT) and page table (PT)), there is an additional layer, the page-map level-4 (PML4). This is to bridge the gap between the full 64-bit addressable space and the actual implementation-specific physical addressable space, e.g., for our CPU, it is a mapping from 64-bit to 52-bit. We generate the tables to map 8 GB (depending on the system e820 table). After the AES-NI library call, we go back to 32-bit mode.

More importantly, the X86 calling conventions are significantly different than x64. The 32-bit X86 mode mainly uses stack space (although it varies with conventions), whereas X64 can take advantage of the additional registers. Therefore, we cannot simply compile the AES-NI library and the rest of HypnoCore separately in different modes, and then call/jump to the entry points directly. In our specific case of gcc, the parameters are passed through rdi, rsi, rdx, rcx, r8 and r9. To address this, we employ a wrapper_64 function, before the trampoline routine goes to the actual function, where we manually extract those arguments from stack (extended to 64-bit when necessary), and save them to corresponding registers.

An ad-hoc situation We are faced with is that Intel's AES-NI library is compiled using YASM (an assembler-disassembler for x86 architectures) and we have to add "–D_linux_" to make the code adapt from Linux convention (as generated by gcc) to Microsoft convention, as required by YASM (by copying rdi to rcx and rsi to rdx). Eventually, the 64-bit AES-NI library is compiled, and linked as a flat binary, copied to the Hypnoguard reserved memory to be called without the compiler's intervention. In this way, the 64-bit AES-NI library runs as if the entire HypnoCore and HypnoDrivers binary is 64-bit, and thus We can encrypt/decrypt memory regions beyond 4 GB limit, while the rest of Hypnoguard still remains in 32-bit mode.

B.4.4 User Interaction

In a regular password-based wakeup-time authentication, the user is shown the password prompt dialog to enter the password. In addition to the password input, in Hypnoguard, we also need to display information for several cases, such as, interacting with the user to set up various parameters during setup, indicating whether the deletion is triggered and displaying the quote (i.e., proof of deletion).

Therefore, we need both standard input and output to interact with the user. This is not a problem either at boot-time (with the support from BIOS), or in the presence of an OS. However, resuming from S3 is a special situation and no BIOS POST is executed. At this time, peripherals (e.g., PCI, USB) are left in an uninitialized state, and unless some custom drivers are implemented, display and keyboard remain nonfunctional. For example, most desktop keyboards are connected via USB and recent versions of BIOS usually have the feature called "legacy USB support". Like a mini-OS, as part of the power-on check (POST), the BIOS (or the more recent UEFI services) would set up the PCI configuration space, perform USB enumeration, initialize the class drivers (such as HID and Mass Storage) and so forth. But when we examined the USB EHCI controller that our USB keyboard was connected to, we found that its base address registers (BARs) were all zeros at wakeup-time, implying that it was not initialized yet. The same phenomenon was also observed with video adapters. As far as we are aware, no reliable mechanisms exist for user I/O after wakeup. In TreVisor, an OS independent FDE, the authors resorted to letting the user input in a blank screen (i.e., keyboard was active, but VGA was uninitialized). Note that the actual situation is motherboard-specific (determined mostly by the BIOS). We tested multiple machines and found that only one out of our five selected machines has the keyboard initialized at wakeup-time.

We decided on a trade-off for a more deterministic deployment of Hypnoguard and tested it on a few machines. For keyboards, if we only consider PS/2, the i8042 controller is always used to connect the keyboard physically with the motherboard. We develop a small universal driver in HypnoDrivers that works with the i8042 controller. It implements two important functions: i8042_crmtraller_init( ) and i8042_enable_kbd_port( ); the second function sets the bits of I8042_CTR_KBDDIS and I8042_CTR_KBDINT to enable the port for keyboard.

For display, we follow the best practices commonly applied in Linux for S3 resume. HypnoDrivers invoke the legacy video routine of BIOS using "lcallw 0xc000,3". 0xc0000 is the start of the VGA RAM where the video BIOS is copied to. The first 3 bytes are the signature and size of the region, and 0xc0003 is the entry point. However, this does not apply to all the motherboards either. By design, any portion of the BIOS code is not supposed to be called after the OS has started up. Thus, the validity of this approach is not guaranteed.

We believe supporting a wider range of devices may only need a reasonable amount of extra effort, which include but not limited to, integrating a full/adapted USB stack and saving configuration state from the sleeping OS and restoring it at wakeup-time. However, this will significantly increase the TCB size. For debugging purpose, we also implement a simple serial port protocol to display all messages to another terminal (the password can also be entered therein). It retains the output messages, which are specifically important to debug system crashes (which happened quite often as we were debugging Intel TXT at wakeup-time, unlike most existing TXT projects). Accordingly, the UEFI S3 resume boot script can be modified for a more universal approach to restore input/output devices at wakeup-time.

B.4.5 Moving Data Around

Hypnoguard operates at different stages, connected by jumping to an address without contextual semantics. Conventional parameter passing in programming languages and shared memory access are unavailable between these stages. Therefore, we need to handle reliably transporting binary data between the stages. To seamlessly interface with the host OS, we apply a similar method as in Flicker (McCune et al in "Flicker: An Execution Infrastructure for TCB Minimization", EuroSys '08, Glasgow, 2008) to create a sysfs object in a user-space file system. It appears in the directory "/sys/kernel" as a few subdirectories and two files: data (for accepting raw data) and control (for accepting commands). In HypnoOSService, the sysfs handlers write the received data to the 1 MB reserved memory region. When S3 is triggered, HypnoDrivers will be responsible for copying the required (portion of) binary to a proper location, for instance, the real-mode wakeup code to 0x8a000, SINIT to the BIOS-determined location S1N1T.BASE and the LCP policy to the OsMleData table (which resides in the TXT heap prepared by HypnoDrivers before entering TXT).

B.4.6 TXT Cleanup

After the regular cleanup when exiting TXT as specified in Intel tboot, an additional step is also required for our use of TXT at wakeup-time. When we first tested tearing down TXT for Hypnoguard (following tboot's implementation), in the resumed Linux, the screen became full of vertical bars with a boxed cursor. In the kernel log, frequent memory violation messages were observed (issued from GPU/disk DMA requests). We suspected that it was about undesired memory protection.

After a re-examination of TXT tear-down code in tboot, we realized that the protection information passed to SINIT was in nowhere toggled back (in the TXT heap, we specify a range that will be protected by VT-d and if that range does not cover the range being executed/measured, TXT will fail). Tboot does not disable it, as tboot is returning to a TXT-aware OS; we make no such assumptions about the OS (e.g. Windows cannot be made TXT-aware). In our case, these PMRs are blocking normal DMA requests. We managed to disable them by writing to the IOMMU register DMAR_PMEN_REG (Enable Protected Memory Region) with the bit DMA_PMEN_EPM set to 0.

B.4.7 Unencrypted Memory Regions

In Hypnoguard's full-memory encryption, the actual encrypted addresses are not contiguous. We leave BIOS/hardware reserved regions unencrypted, which fall under two categories, (a) MMIO space: platform-mapped memory and registers of I/O devices and peripherals, e.g., the TPM locality base starts at 0xfed40000. (b) Platform configuration data: memory ranges used by BIOS/UEFFACPI; the properties of such regions vary significantly, from read-only to non-volatile storage (NVS).

Initially, when we encrypted the whole RAM, including these reserved regions, we observed infrequent unexpected system behaviors (e.g., system crash). As much as we are aware of, no user or OS data is stored in those regions (for platform secret/sensitive data), and thus there should be no loss of confidentiality due to keeping those regions unencrypted. Hypnoguard parses the e820 (memory mapping) table to determine the memory regions accessible by the OS and user applications. In our test system, there is approximately 700 MB reserved space, spread across different ranges below 4 GB. The amount of physical memory is compensated by shifting the addresses, e.g. for our 8 GB RAM, the actual addressable memory range goes up to 8.7 GB.

4.8 Variant: Partial Memory Encryption Via Mmap( )

We also implement a variant of Hypnoguard for systems with larger RAM (e.g. 32 GB), to avoid noticeable delays during sleep/wake cycles. For example, according to our current performance (see Section B.5.4), if a gaming system has 32 GB RAM, it will take about four seconds for both entering sleep and waking up, which might be unacceptable. To address such cases, Hypnoguard exposes a file system interface compliant with the POSIX call mmap( )

The mmap( ) function is defined in the file_operations structure, supported by kernel drivers exposing a device node in the file system. An application can request a page to be mapped to its address space on each mmap call (e.g., instead of calling malloc( ). On return, a virtual address mapped into the application's space is generated by Hypnoguard using remap_pfn_range( ). An application only needs to call mmap( ) and use the returned memory as its own for all subsequent operations, including storing its secrets to that page. Then the page is automatically protected by Hypnoguard the same way as the full-memory encryption, i.e., encrypted before sleep and decrypted at wakeup. The application can use multiple pages as needed. We currently do not consider releasing such pages (i.e., no unmap( )), as we consider a page to remain sensitive once it has been used to store secrets. Note that, this Hypnoguard variant requires applications to be modified (but no kernel patching).

B.5. High-Speed Full-Memory Encryption

The feasibility of our current design of Hypnoguard relies on the fact that the full-memory encryption (and decryption) can be done in a very quick manner so that it does not affect user experience. Below, we discuss issues related to our implementation of quick memory encryption.

5.1 Native Execution

We cannot perform in-place memory encryption when the OS is active, due to OS memory protection and memory read/write operations by the OS. Thus, the OS must be inactive when we start memory encryption. Likewise, at wakeup-time in TXT, there is no OS run-time support for decryption. For the encryption/decryption of the whole memory using SK (per sleep/wake cycle symmetric key), we use AES. We need to perform an RSA decryption using HGPRIV (to decrypt SK); however, as SK is short (128 bits), we need only one RSA decryption (not a performance concern). On the other hand, we need fast AES implementation to encrypt the whole memory (e.g., 8 GB), and thus, we leverage new AES instructions in modern CPUs (e.g., Intel AES-NI). AES-NI offers significant performance boost. Although several cryptographic libraries now enable easy-to-use support for AES-NI, we cannot use such libraries, or the kernel-shipped library, as we must use AES-NI outside the OS. We use Intel's AES-NI library, implemented in assembly with C encapsulation, with minor but non-trivial modifications (see Section B.5.3).

B.5.2 OS-Less Multi-Core Processing

Outside the OS, no easy-to-use parallel processing interface is available, unlike kthread_run( ) in kernel mode and pthread_create( ) in user mode. With one processor core, we achieved 3.3-4 GB/s with AES-NI in our tests, which would require more than 2 seconds for 8 GB RAM (still less satisfactory, considering 3 cores being idle). Thus, to leverage multiple cores, we develop our own multi-core processing engine. Two slightly different techniques are used for before entering sleep (through regular inter-processor interrupts, IPIs), and after waking up (in TXT). Our choice of decrypting in TXT is non-essential, as SK is generated per sleep/wake cycle and requires no TXT protection; however, implementation-wise, the current logic is simpler and requires no post-TXT cleanup for native multicore processing.

Multiple Cores in TXT.

When the bootstrap processor (BSP) enters TXT, all application processors (APs) will be in an SENTER sleep state. So the sequence for enabling multi-core processing cannot be the same as discussed above. Aps can be woken up by either GETSEC[WAKEUP] (another leaf function of GETSEC) or setting a non-zero value to rlp_wakeup_addr, a field in the TXT heap, if supported. Our test machine happens to support the second method (indicated by rlp_wake_monitor capability).

In both cases, a special data structure must be filled with the address of the entry point, the CS (code segment), the GDT base and the GDT limit. The address of this structure is then written to TXT's private configuration register TXT-CR_MLE_JOIN that both methods recognize.

Once we are able to restart APs freely with an entry point of our choice, we proceed to divide the workload (memory regions) evenly and assign to them. Although they are expected to finish at the same time, we still need to coordinate with a simplified mutex mechanism (adapted from tboot). A single assembly trampoline (for housekeeping such as loading GDT) and a C processing function are shared among APs and assigned memory ranges to be processed are distinguished by LAPIC IDs (e.g., base+size*lapic_id).

B.5.3 Modes of Operation

Intel's AES-NI library offers ECB, CTR and CBC modes. We use AES in CTR mode (with a random value as the initial counter); compared to ECB, CTR introduces per-block tweak (the counter) and does not reveal any patterns of the plaintext. Also, compared to CBC, CTR's performance is better, and symmetric between encryption and decryption speeds. This is caused by the fact that encryption and decryption in CTR mode are the same operation, while only the decryption operation in CBC can be parallelized because of chaining. In our test, CBC achieves 4.5 GB/s for encryption and 8.4 GB/s for decryption. In CTR mode, a more satisfactory performance is achieved: 8.7 GB/s for encryption and 8.5 GB/s for decryption (approximately).

Alignment Issue in Intel's AES-NI Library.

During the process of the implementation, we identified a potential issue in the assembly module of Intel's 64-bit AES-NI library (only CTR mode). In iEnc128_CTR, there is one instruction that requires the first argument to be 16-byte aligned: movdqa [rsp+16*16], xrrun6.

However, we have no control over where the stack pointer (rsp) is. Especially, even if we always assume rsp is 16-byte aligned on its entry, the instruction before it breaks this situation (sub rsp, 16*16+8+16). In consequence, the system crashes with a general protection error (depending on the calling context). We ended up having to patch it as follows:

| | |
|---|---|
| •mov rax , rsp | //stack pointer into rax for processing |
| •and eax , 15 | //take the least significant nibble |
| •sub rsp , rax | //subtract the nibble from the stack pointer so that it is guaranteed to be 16-byte aligned |
| •push rax | //save what we have done for later reversion |
| •. . . | //the actual CTR function in AES-NI library |
| •pop rax | //load what was subtracted |
| •add rsp , rax | //reverse what we have done |

B.5.4 Performance Analysis

For AES-CTR, we achieved 3.3-4.0 GB/s, using a single core. After a preliminary evaluation, we found the performance is not linear to the number of processor cores, i.e., using 4 cores does not achieve the speed of 16 GB/s, but at most 8.7 GB/s (8.3 GB/s on 3 cores and 7.25 GB/s on 2 cores).

A potential cause could be Intel's Turbo Boost that temporarily increases the CPU frequency when certain limits are not exceeded (possibly when use single core only). Suspecting the throughput of the system RAM to be the primary bottleneck, we performed benchmark tests with user-space tools, e.g., mbw, which simply measures memcpy and variable assignment for an array of arbitrary size. The maximum rate did not surpass 8.3 GB/s. We believe it is normal as it must be heavily impacted by the activities of the OS or other processes. At the end, 8.7 GB/s satisfies our requirement of not affecting user experience, specifically, for systems up to 8 GB RAM. Note that, we have zero run-time overhead, after the OS is resumed.

B.5.5 Integrity-Verification of Memory Content at Wakeup

One attack possibility against the regular Hypnoguard construction (using the CTR mode of encryption), is memory manipulation attacks, e.g., insertion of malicious code via a custom DRAM interposer. Such insertion to the encrypted RAM content may lead to compromise the OS/applications after wakeup. This advanced attack is addressed by our GCM mode implementation of Hypnoguard.

We first construct a custom AES-GCM implementation with the support for parallelized decryption, and integrate it with the Intel AES-NI library. However, encryption is still much faster than decryption (1.55 times) even when all other factors are the same. Decrytption performance is critical for a quick wakeup experience (close to a one-second delay). Note that in GCM, decryption is composed of a tag verification phase and the actual decryption. Our analysis shows that the tag verification accounts for a significant portion of the latency (a complete separate loop through all the data blocks). But this sequential processing is apparently necessary: the tag verification should be done before the (more) processing-intensive decryption operation is performed.

We propose a significant change in GCM implementation for boosting GCM decryption performance that fits certain circumstances, e.g., in our case where it does not matter if the plaintext content is already decrypted in RAM when an anomaly is detected (Hypnoguard can just halt/reboot the machine when tag verification fails). To this end, we try to remove the upfront tag verification, and integrate it into the existing decryption loop. Recall that during encryption the tag is generated along-side, and the logic is partially reusable and helpful for adapting the decryption function. The new construction only contains one loop through the ciphertext blocks, and GHASH is calculated for each iteration and the tag value is updated. We eventually managed to make run this construction, and have verified that at the end of the decryption, Hypnoguard is able to notify the user if authenticity of the RAM data is compromised; the user can then reboot or shut down the machine. Our GCM implementation with deferred tag verification achieves 6.8 GB/s, taking only 1.18 seconds to wake up.

B.6. Security Analysis

Below, we discuss potential attacks against Hypnoguard; see Section B.2.3 for our threat model, and Section B.3.3 for the discussion on how specific security goals are achieved.

B.6.A Cold-Boot and DMA Attacks.

As no plaintext secrets exist in memory after the system switches to sleep mode until a correct Hypnoguard user password is entered, memory extraction attacks via cold-boot or DMA cannot compromise memory confidentiality. If a cold-boot attack is launched when Hypnoguard is waiting for user input at the wakeup time, the attacker still does not get SK or HGPRIV (as they are revealed only after the correct password is entered). Also, the password evaluation logic is effectively run inside the TPM (see Section B.3.2), and thus the correct password is not revealed in memory for comparison. Note that, at wakeup-time, DMA attacks will also fail due to memory access restrictions (TXT/VT-d).

B.6.B Reboot-and-Retrieve Attack.

The adversary can simply give up on waking back to the original OS session, and soft-reboot the system from any media of his choice, to dump an arbitrary portion of the RAM with most content unchanged (the so-called warm boot attacks). Several such tools exist, some of which are applicable to locked computers. With Hypnoguard, as the whole RAM is encrypted, this is not a threat any more.

B.6.C Consequence of Key Deletion.

The deletion of HGPRIV restricts guessing attacks on lost/unattended computers. For coercive situations, deletion is needed so that an attacker cannot force users to reveal the Hypnoguard password after taking a memory dump of the encrypted content. Although we use a random AES key (SK) for each sleep-wake cycle, simply rebooting the machine instead of key deletion may not be ideal, as the attacker can store all encrypted memory content, including SK encrypted by HGPUB. If HGPRIV can be learnt afterwards (e.g., via coercion of Hypnoguard user password), the attacker can then decrypt SK, and reveal memory content for the target session.

If a boot-time anti-coercion tool such as Gracewipe, see Section A, is integrated with Hypnoguard, the deletion of HGPRIV may also require triggering the deletion of Gracewipe secrets. Hypnoguard can easily trigger such deletion by overwriting TPM NVRAM indices used by Gracewipe, which we have verified in our installation. Note that, from usability perspective, the consequence of key deletion in Hypnoguard is to reboot and rebuild the user secrets in memory, e.g., unlocking an encrypted disk, password manager, or logging back into security-sensitive websites, With Gracewipe integration, triggering deletion will cause loss of access to disk data.

B.6.D Compromising the S3 Resume Path.

As of writing, the inventors are not aware of any DMA attacks that can succeed when the system is in sleep mode, as such attacks require an active protocol stack (e.g., that of FireWire). Even if the adversary can use DMA attack tools such as Inception to alter RAM contents in sleep, bypassing Hypnoguard still reveals no secrets, due to full memory encryption and the unforgeability of TPM measurements. Similarly, replacing the Hypnoguard waking vector with an attacker chosen one (as our waking vector resides in memory unencrypted), e.g., by exploiting vulnerabilities in UEFI resume boot script (if at all possible), also has no effect on memory confidentiality.

B.6.E Interrupting the Key Deletion.

There have been a few past attacks about tapping TPM pins to detect the deletion when it is triggered (for guessing without any penalty). Such threats have been discussed above in respect of Gracewipe, and can be addressed, e.g., integrated TPM chip in the SuperIO with new motherboards, and redundant write operations.

B.6.F Ad-Hoc Hardware Attacks.

Ad-hoc hardware attacks to sniff the system bus for secrets are generally inapplicable against Hypnoguard, as no secrets are processed before the correct password is entered. For such an example attack, see the Xbox hack, this only applies to architectures with LDT (HyperTransport) bus, not Intel's FSB.

B.7. Distinguishing and Superior Aspects

B.7.1 Protection Against Cold-Boot and DMA Attacks.

Solutions to protecting keys exposed in system memory have been extensively explored, apparently, as a response to the feasibility of cold-boot attacks. There have been proposals based on relocation of secret keys from RAM to other "safer" places, such as SSE registers, debug registers, MSR registers, AVX registers, CPU cache and debug registers, GPU registers, and debug registers and Intel TSX. Solutions requiring special hardware have also been proposed; for example, using a special hardware unit to encrypt and decrypt data between CPU/RAM.

A common limitation of these solutions is that specific cryptographic operations must be offloaded from the protected application to the new mechanism, mandating per-application changes. They are also focused on preventing leakage of only cryptographic keys, which is fundamentally limited in protecting RAM content in general. Also, some solutions do not consider user re-authentication at wakeup-time), or assume user passwords of adequate strength (as in regular OS unlock prompt). We note that several of them (re)derive their master secret (or its equivalent) from the user password which may even allow the adversary to directly guess the master secret instead of the password for re-authentication (due to the same entropy).

B.7.2 Memory Encryption.

An ideal solution for memory extraction attacks would be to perform encrypted execution: instructions remain encrypted in RAM and are decrypted right before execution within the CPU. Most proposals for memory encryption deal with data in use by an active CPU. However, our use of full memory encryption involves the sleep state, when the CPU is largely inactive. Most systems require architectural changes in hardware/OS (and thus remain largely unadopted), or are designed for specialized use cases (e.g., bank ATMs) using dedicated/custom processors, some gaming consoles also implement memory encryption (to some extent, e.g., Xbox™, Playstation™), which Hypnoguard does not. Similar to storing the secrets in safer places, memory encryption schemes (if implemented/adopted) may address extraction attacks, but not user re-authentication, which Hypnoguard does.

B.7.3 Forced Hibernation.

YoNTMA ("You'll Never Take Me Alive"), an application intended to enhance BitLocker's data protection on Windows laptops transforms the wakeup-time challenge over to the boot-time, assuming regular authentication is sufficient. It automatically hibernates the machine (i.e., switch to S4/suspend-to-disk) whenever it detects that the wired network is disconnected or the power cable is unplugged. In this way, if the attacker wants to take the computer away, he will always get it in a powered-off state, and thus memory attacks are mitigated. A persistent attacker may preserve the power supply by using off-the-shelf hardware tools. Also, the attacker does not have to move the computer away to perform cold-boot/DMA attacks. Hypnoguard does not have these limitations.

B.7.4 Recreating Trust after S3 Sleep.

To re-establish a secure state when the system wakes up from S3 it has been proposed to exploit use of Intel TXT and TPM elements for recreating the trusted environment, in the setting of a Virtual Machine Manager (VMM) with multiple Virtual Machines (VMs). Upon notification of the S3 sleep, the VMM cascades the event to all VMs. Then each VM encrypts its secrets with a key and seals the key with the platform state. The VMM also encrypts it secrets and seals its context. Thereafter, the VMM loader (hierarchically higher than the VMM) encrypts the measurement of the whole memory space of the system with a key that is also sealed. At wakeup-time, all checks are done in the reversed order. If any of the measurements differ, the secrets will not be unsealed. However, this proposal does not consider re-authentication at wakeup-time and mandates per-application/VM modifications. More importantly, sealing and unsealing are performed for each sleep/wakeup cycle for the whole operating context (VMM loader, VMM, VMs). Depending on how the context being sealed is defined, this may pose a severe performance issue, as TPM sealing/unsealing is very time-consuming (according to our experiment, it takes more than 500 ms for 16 bytes).

B.7.5 Unlocking with Re Authentication at S2/3/4 Wakeup.

When waking up from one of the sleep modes, a locked device (such as an FDE hard drive) may have already lost its security context (e.g., being unlocked) before sleep. Within the prior art a mechanism to securely re-authenticate the user to the device by replacing the original wakeup vector of the OS with a device specific S3 wakeup handler has been proposed. The user is prompted for the credential which is directly used to decrypt an unlock key from memory to unlock the device (e.g., the hard drive). This approach does not use any trusted/privileged execution environment, such as Intel TXT/AMD SVM, which Hypnoguard does. Without the trusted measurement (i.e., no sealed master key), the only entropy comes from the user password, which may allow a feasible guessing attack.

B.7.6 Secure Deallocation.

To prevent exposure of memory-bound secrets against easy-to-launch warm-reboot attacks, it has been proposed to exploit a secure deallocation mechanism (e.g., zeroing freed data on the heap) to limit the lifetime of sensitive data in memory. This approach avoids modifications in application source, but requires changes in compilers, libraries, and OS kernel in a Linux system (and also cannot address cold-boot attacks). In contrast, Hypnoguard is also effective against warm-reboot attacks, but requires no changes in applications and the OS stack.

B.7.7 Mobile Platforms.

Considering their small sizes and versatile functionalities, mobile devices are more theft-prone and more likely to be caught with sensitive data present when the user is coerced. Eviction has been proposed to evict sensitive data not in active use to the cloud and only retrieve the data back when needed. Sensitive information is pre-classified and encapsulated into sensitive data objects (SDOs). Access to SDOs can be revoked in the case of device theft and audited in normal operations. In a similar vein other proposals consider a mobile file system which provides a fine-grained access auditing using a remote server (which also hosts the encryption keys), For lost devices, access can be easily revoked by not releasing the key from the server. Both proposals require a trusted third party, which Hypnoguard does not. Also, under coercion, if the user is forced to cooperate, sensitive data will still be retrieved, Moreover, the protected secrets in Hypnoguard might not be suitable for being evicted as they may be used often, e.g., an FDE key.

B.7.8 Microsoft's BitLocker.

Microsoft's drive encryption tool BitLocker can seal the disk encryption key in a TPM chip, if available. Components that are measured for sealing include: the Core Root of Trust Measurement (CRTM), BIOS, Option ROM, MBR, and NTFS boot sector/code. In its most secure mode, Microsoft recommends to use BitLocker with multi-factor authentication such as a USB device containing a startup key and/or a user PIN, and to configure the OS to use S4/suspend-to-disk instead of S3/suspend-to-RAM. In this setting, unattended computers would always resume from a powered-off state (cf. YoNTMA), where no secrets remain in RAM; the user needs to re-authenticate with the PIN/USB key to restore the OS.

In contrast to Microsoft's BitLocker, Gracewipe and Hypnoguard measure components that are OS and BIOS independent (may include the UEFI firmware in later motherboard models). BitLocker's FDE functionality can be complemented with boot-time and sleep/wake protections of Gracewipe and Hypnoguard. Gracewipe and Hypnoguard resolve the following limitations of BitLocker. (1) BitLocker undermines the usability of sleep modes as even with faster SSDs it still takes several seconds to hibernate (approx. 18 seconds in our tests with 8 GB RAM in Windows 10 machine with Intel Core-i5 CPU and SSD). Wakeup is also more time-consuming, as it involves the BIOS/UEFI POST screen before re-authentication (approx. 24 seconds in our tests). On the other hand, RAM content remains unprotected if S3 is used. (2) BitLocker is still vulnerable to password guessing to some extent, when used with a user PIN (but not with USB key, if the key is unavailable to the attacker). Based on our observation, BitLocker allows many attempts, before forcing a shutdown or entering into a TPM lockout (manufacturer dependent). A patient adversary can slowly test many passwords. We have not tested if offline password guessing is possible. (3) BitLocker is not designed for coercive situations, and as such, it does not trigger key deletion through a deletion password or fail counter. If a user is captured with the USB key, then the disk and RAM content can be easily accessed. (4) Users also must be careful about the inadvertent use of BitLocker's online key backup/escrow feature.

B.7.9 Gracewipe.

For handling user secrets in the trusted execution environment we have followed the methodology from Gracewipe described in Section A. This operates at boot-time and thus can rely on BIOS (and tboot). In contrast, Hypnoguard operates during the sleep/wakeup cycle, when no BIOS is active, and tboot cannot be used for regular OSes (tboot assumes TXT-aware OS kernel). Gracewipe assumes that the attacker can get physical possession of a computer, only when it is powered-off (in contrast to Hypnoguard's sleep state, which is probably more common). Gracewipe securely releases sensitive FDE keys in memory, but does not consider protecting such keys against memory extraction attacks during sleep/wake states. Gracewipe addresses an extreme case of coercion, where the data-at-rest is of utmost value, Hypnoguard targets unattended computer systems in general and is to the inventor's knowledge the first wakeup-time secure environment for general-purpose re-authentication and key release. In combination, Gracewipe and Hypnoguard provide comprehensive protections for disk and memory data.

B.8. Remarks on Hypnoguard

As most computer systems, particularly laptops within PEDs, remain in sleep mode while not actively used, we consider a comprehensive list of threats against memory-resident user/OS data, security-sensitive or otherwise (which is a difficult distinction to make). Hypnoguard addresses an important gap left in existing solutions: comprehensive confidentiality protection for data-in sleep, when the attacker has physical access to a computer in sleep. We designed and implemented prototypes of Hypnoguard, which encrypts the whole memory very quickly before entering sleep under a key sealed in TPM with the integrity of the execution environment. We require no per-application changes or kernel patches. Hypnoguard enforces user re-authentication for unlocking the key at wakeup-time in a TXT-enabled trusted environment. Guessing attacks bypassing Hypnoguard is rendered ineffective by the properties of TPM sealing; and guessing through Hypnoguard will trigger deletion of the key. Thus, Hypnoguard along with a boot-time protection mechanism with FDE support such as Gracewipe can enable effective server-less guessing resistance, when a computer with sensitive data is lost/stolen.

Within the embodiments of the invention described and depicted in respect of FIG. 1 to 3 and the descriptions within Sections A and B the primary mode of deployment of the methodologies and systems therein described has been with respect of computer systems such as a laptop computer, or a mobile device, for example, to which the user has physical access. However, it would be evident that embodiments of the invention may be applied to an PED, FED, wearable device, computer server, or other computer system upon which sensitive data, personal data etc. are stored that the user or an employer associated with the user do not wish a third party to have access to.

Further, embodiments of the invention have been described with respect to the provisioning of one of two (or more passwords) wherein a first password allows access to the encrypted data and the second password (or other passwords) triggers secure deletion of the encryption key used to encrypt the data. Such passwords may be directly entered by the user such as via a keyboard, for example, or through voice/cursor actions or they may alternatively be derived from a biometric verification or through a combination of the two thereof. For example, the valid biometric may be the user's left index finger wherein any other finger is invalid and triggers deletion of the encryption key. Many variations would be evident to one of skill in the art.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine, which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g., software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of evaluating secrets in a general purpose computer system without using any specialized hardware or circuit, wherein a trusted execution environment is provided for evaluating secrets through the use of an active secure execution mode of a computer's CPU and a passive security chip considering possible vulnerabilities and possible attacks and eliminating said vulnerabilities and said possibilities of attacks, including providing the said trusted execution environment during the boot up of the computer system or the wake up from sleep mode;

the trusted execution environment, using the active secure execution mode of the CPU and the passive security chip, enables tamper-proof evaluation and management of keys, tamper-proof execution of custom unlock/deletion logic, binding between the intact integrity of the trusted execution environment and the encryption key; and enforcing and later attesting the intact software state of the computer;

bypassing the trusted execution environment renders the stored encryption key or keys inaccessible;

upon entering a secret in a guessing-resistant manner, including showing plausible compliance when facing coercion, and after evaluation of the secret, a securely stored encryption key protecting either on-disk or in-memory data is either unlocked upon entering a secret associated with encryption key retrieval or deleted in a cryptographically verifiable manner or in a non-verifiable manner upon entering a secret associated with encryption key deletion or upon entering a specified number of incorrect secrets; and enabling secrets for key retrieval and secrets for key deletion to be indistinguishable pattern from each other and from undefined secrets without prior knowledge hence imposing high guessing risk, and ensuring undetectable deletion trigger and plausible user compliance under coercion.

2. The method according to claim 1, wherein
the active secure execution mode of the CPU and the passive security chip comprises at least one of:
a Trusted Platform Module (TPM) and a CPU with Trusted Execution Technology (TXT);
a TPM and a CPU with Secure Virtual Machine (SVM);
a CPU with Software Guard Extensions (SGX) with built-in secure storage; and
a Secure Element and a CPU with TrustZone.

3. The method according to claim 1, further comprising of the step:
associating the encryption key with an on-disk or in-memory encrypted storage, wherein
retrieval of the encryption key permits decryption of the encrypted storage,
deletion of the encryption key makes the encrypted storage irreversibly undecryptable, and
both the retrieval and deletion logic depends on the user-supplied secret and on the software state of the computer being intact.

4. The method according to claim 1, wherein
the intact software state of the computer can be enforced and later attested by the CPU's trusted execution mode and a passive security chip, and
further enhancing with at least one of:
the secret associated with the retrieval of the encryption key is one of a plurality of secrets, wherein each of the plurality of secrets associated with encryption key retrieval results in the retrieval of the encryption key; and
the secret associated with the deletion of the encryption key is one of a plurality of secrets, wherein each of the plurality of secrets associated with encryption key deletion results in the deletion of the encryption key in a cryptographically verifiable manner or in a non-verifiable manner.

5. The method according to claim 1, further comprising of steps:
creating two encrypted data storages on-disk or in-memory within the computer system; and
associating at least three secrets, wherein each of a pair of the at least three secrets allow retrieval and use of encryption key associated with one of the two encrypted data storages and the third secret securely deletes the encryption key associated with a preselected encrypted data storage of the two encrypted data storages.

6. The method according to claim 5, wherein
the at least three secrets are part of a plurality of secrets wherein each of the plurality of secrets other than the at least three secrets, after entering more than a specified number of times, also results in the deletion of the encryption key associated with the preselected encrypted data storage of the two encrypted data storages; and the intact software state of the computer can be enforced and later attested to by the CPU's trusted execution mode and a passive security chip.

7. A method of evaluating secrets in a computer system's trusted execution environment, wherein after evaluation of secrets, a securely stored encryption key is either unlocked upon entering a secret associated with encryption key retrieval or deleted in a cryptographically verifiable manner or in a non-verifiable manner upon entering a secret associated with encryption key deletion, comprising of steps:
creating two encrypted data storage within the computer system; and
associating at least three secrets, wherein each of a pair of the at least three secrets allow retrieval and use of encryption key associated with one of the two encrypted data storages and the third secret securely deletes the encryption key associated with a preselected encrypted data storage of the two encrypted data storages,
providing a hidden system upon the computer system for storing selected data;
providing a decoy system upon the computer system for storing other data;
encrypting the data being stored upon the hidden system with a first encryption key, KH;
encrypting the other data being stored upon the decoy system with a second encryption key, KN;
associating a first secret, PH, for retrieving KH; wherein entry of PH retrieves KH in order to either retrieve selected data or to store additional data within the hidden system;
associating a second secret, PN, for retrieving KN; wherein entry of PN retrieves KN in order to either retrieve other data or to store additional data within the decoy system; and
associating a third secret, PD, for performing a secure deletion of KH; wherein entry of PD results in secure deletion of KH.

8. The method according to claim 7, wherein
PD is one of a plurality of PDs, each of which results in secure deletion of KH.

9. The method according to claim 7, wherein
each of PH, PN, and PD is one of a plurality of passwords based on distance-based password scheme, whereas each password from password space PH results in retrieving KH, each password from password space PN results in retrieving KN, and each password from password space PD results in secure deletion of KH, and
all passwords from password space PN are farther than passwords of password space PH are from the center of password space PH, and all passwords from password space PD are farther than passwords from password spaces PH and PN are from the center of the password space PH.

10. The method according to claim 7, wherein
invalid entry of passwords are counted;
counts are stored in a tamper-proof manner; and
upon reaching a threshold count of invalid entry of passwords also results in the secure deletion of KH.

11. The method according to claim 7, wherein
active secure execution mode of the CPU and a passive security chip provides a trusted execution environment, which enables tamper-proof execution of custom unlock/deletion logic, and binding between the integrity of the trusted execution environment and the encryption key; and the active secure execution mode of the CPU and the passive security chip comprises at least one of:

a Trusted Platform Module (TPM) and a CPU with Trusted Execution Technology (TXT);
a TPM and a CPU with Secure Virtual Machine (SVM);
a CPU with Software Guard Extensions (SGX) with built-in secure storage; and
a Secure Element and a CPU with TrustZone.

12. The method according to claim 7, wherein
the encryption keys KH and KN are at least one of stored and sealed within non-volatile random access memory (NVRAM) of the TPM.

13. The method according to claim 7, wherein
the encryption keys KH and KN are bound to the state of the computer software.

14. The method according to claim 13, wherein
binding to the intact state of the computer software is achieved by the active secure execution mode of the CPU in conjunction with the passive security chip.

15. The method according to claim 7, wherein
the hidden system and the decoy system are each at least one of software based full disk encryption (FDE) and hardware-based FDE.

16. The method according to claim 15, wherein
the software based FDE includes support for plausible deniability.

17. The method according to claim 7, wherein
the encryption key is deleted on one or more network connected computer system by remotely sending the secret through a secure network tunnel, where the secret is associated with encryption key deletion and the evaluation of the secret is performed in the intact software state of the computer, enforced and attested by the active trusted execution environment of the CPU and the passive security chip.

18. The method according to claim 17, wherein
each network connected computer system sends back verifiable proof of the deletion of the encryption key.

19. A computer subsystem comprising of:
a hidden system forming part of a computer system storing encrypted data with a first encryption key, KH; and
a decoy system forming part of the computer system storing encrypted other data with a second encryption key, KN;
with a first password, PH, for retrieving KH in order to either retrieve secured data or store additional data within the hidden system;
a second password, PN, for retrieving KN in order to either retrieve other data or store additional data within the decoy system; and
a third password, PD, with performing a secure deletion of KH; whereas receiving PD results in secure deletion of KH.

20. A computer subsystem according to claim 19, further comprising of:
a computer readable medium storing executable instructions thereon that, when executed by a CPU, perform the steps to build the computer subsystem of claim 19, including encrypting data stored in the hidden system and the decoy system, and associating the passwords PH, PN, and PD.

21. A computer subsystem according to claim 20, wherein the computer readable medium storing executable instructions thereon that, when executed by a CPU, further perform the following steps:

establishing the hidden system upon the computer system; and
establishing the decoy system upon the computer system.

22. A method of evaluating secrets in a computer system's trusted execution environment, wherein
after evaluation of secrets, a securely stored encryption key is either unlocked upon entering a secret associated with encryption key retrieval or deleted in a cryptographically verifiable manner or in a non-verifiable manner upon entering a secret associated with encryption key deletion; and
during a sleep-wake event of a computer system memory is encrypted with a symmetric key (SK) as computer system enters a sleep mode of the sleep-wake event and the SK is encrypted with a public encryption key (HGPUB) such that the encrypted memory can only be decrypted with entry of the correct secret (PW) to retrieve a private key HGPRIV corresponding to HGPUB that allows decryption of SK and subsequent decryption of encrypted memory and entry of a preselected deletion password (PD) will delete HGPRIV, and both the retrieval of HGPRIV and deletion logic depends on the software state of the computer, and the user-supplied secret.

23. The method according to claim 22, wherein the PD is one of a plurality of secrets wherein each of the plurality of secrets results in deletion of HGPRIV.

24. The method according to claim 22, wherein failure to enter the correct secret within a predetermined number of attempts also results in deletion of HGPRIV.

25. A method of evaluating secrets in a computer system's trusted execution environment, wherein
after evaluation of secrets, a securely stored encryption key is either unlocked upon entering a secret associated with encryption key retrieval or deleted in cryptographically verifiable manner or in a non-verifiable manner upon entering a secret associated with encryption key deletion; and
comprises of the following steps during a sleep-wake event of a computer system:
associating a symmetric encryption key (SK) with the encryption of the memory of the computer system upon the initiation of a sleep mode of the computer system;
encrypting the memory of the computer system with SK during entry into the sleep mode of the computer system;
receiving a public key, HGPUB, for encrypting SK during entry into the sleep mode of the computer system;
storing the encrypted SK within the memory of the computer system;
receiving a correct secret (PW) during initiation of a wake mode of the computer system after the sleep mode has been entered;
retrieving a private key HGPRIV corresponding to HGPUB from secure storage of the trusted execution environment upon receipt of PW;
decrypting SK when HGPRIV is retrieved allowing subsequent decryption of the encrypted memory encrypted with SK during entry into the sleep mode;
wherein
receipt of a special deletion secret (PD) instead of PW, during initiation of the wake mode of the computer system after the sleep mode has been entered results in deletion of HGPRIV or receipt of multiple incorrect secrets during initiation of the wake mode of the computer system after the sleep mode has been entered results in deletion of HGPRIV.

26. The method according to claim 25, wherein PD is one of a plurality of PDs, each of which results in secure deletion of HGPRIV.

27. The method according to claim 25, wherein active secure execution mode of the CPU and a passive security chip provides a trusted execution environment, which enables tamper-proof execution of custom unlock/deletion logic, and binding between the integrity of the trusted execution environment and the encryption key; and the active secure execution mode of the CPU and the passive security chip comprises at least one of:

a Trusted Platform Module (TPM) and a CPU with Trusted Execution Technology (TXT);
a TPM and a CPU with Secure Virtual Machine (SVM);
a CPU with Software Guard Extensions (SGX) with built-in secure storage; and
a Secure Element and a CPU with TrustZone.

28. The method according to claim 25, wherein the HGPRIV private key is at least one of stored and sealed within non-volatile random access memory (NVRAM) of the TPM.

29. The method according to claim 25, wherein GCM mode is used to check whether the authenticity of the data in memory is compromised upon wakeup from a sleep mode.

30. The method according to claim 29, wherein GCM mode defers tag verification and runs tag verification during decryption process to improve decryption performance.

31. A computer subsystem comprising of:
a symmetric encryption key (SK) stored within the memory of the computer system associated with the encryption of the memory of the computer system upon the initiation of a sleep mode of the computer system;
encrypted memory of the computer system encrypted with SK during entry into the sleep mode of the computer system;
a public key, HGPUB, for encrypting SK during entry into the sleep mode of the computer system;
storing the encrypted SK within the memory of the computer system;
receiving a correct secret (PW) during initiation of a wake mode of the computer system after the sleep mode has been entered;
retrieving a private key HGPRIV corresponding to HGPUB from secure storage of the computer system upon receipt of PW;
decrypting SK when HGPRIV is retrieved allowing subsequent decryption of the encrypted active system memory encrypted with SK during entry into the sleep mode;
wherein
receipt of a special deletion password (PD) instead of PW, during initiation of the wake mode of the computer system after the sleep mode has been entered results in deletion of HGPRIV or receipt of multiple incorrect passwords during initiation of the wake mode of the computer system after the sleep mode has been entered results in the deletion of HGPRIV.

32. The computer subsystem according to claim 31, further comprising of
a computer readable medium storing executable instructions thereon that, when executed by a CPU, performs a method comprising of all the steps needed.

* * * * *